United States Patent
Ray et al.

(10) Patent No.: US 11,790,895 B2
(45) Date of Patent: Oct. 17, 2023

(54) SYSTEM AND METHOD FOR NATURAL LANGUAGE UNDERSTANDING

(71) Applicant: Samsung Electronics Co., Ltd., Suwon-si (KR)

(72) Inventors: Avik Ray, Sunnyvale, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 16/661,581

(22) Filed: Oct. 23, 2019

(65) Prior Publication Data

US 2020/0410989 A1 Dec. 31, 2020

Related U.S. Application Data

(60) Provisional application No. 62/866,755, filed on Jun. 26, 2019.

(51) Int. Cl.
*G10L 15/18* (2013.01)
*G06N 20/00* (2019.01)
(Continued)

(52) U.S. Cl.
CPC ........ *G10L 15/1815* (2013.01); *G06F 40/205* (2020.01); *G06F 40/284* (2020.01); *G06N 20/00* (2019.01)

(58) Field of Classification Search
CPC .... G06F 17/241; G06F 17/271; G06F 17/274; G06F 17/279; G06F 17/2765;
(Continued)

(56) References Cited

U.S. PATENT DOCUMENTS 6,405,168 B1 * 6/2002 Bayya ............... G10L 15/07
704/253
6,535,850 B1 * 3/2003 Bayya ............... G10L 15/07
704/239
(Continued)

FOREIGN PATENT DOCUMENTS

| KR | 10-1896973 B1 | 9/2018 |
| WO | 2018/236332 A1 | 12/2018 |
| WO | 2019/074509 A1 | 4/2019 |

OTHER PUBLICATIONS

Sharma et al., "Natural Language Generation In Dialogue Using Lexicalized and Delexicalized Data", Workshop track—ICLR 2017. (Year: 2017).*

(Continued)

*Primary Examiner* — Anne L Thomas-Homescu

(57) ABSTRACT

An electronic device for natural language understanding includes at least one memory and at least one processor coupled to the at least one memory. The at least one processor is configured to process an utterance using a trained model. The at least one processor is also configured to replace a first portion of the utterance with a first token, where the first token represents a semantic role of the first portion of the utterance based on a slot vocabulary. The at least one processor is further configured to determine a slot value in the utterance based on the first token. In addition, the at least one processor is configured to perform a task corresponding to the utterance based on the determined slot value.

22 Claims, 13 Drawing Sheets

(51) Int. Cl.
*G06F 40/205* (2020.01)
*G06F 40/284* (2020.01)

(58) Field of Classification Search
CPC . G06F 17/2872; G10L 15/18; G10L 15/1815; G10L 15/19; G10L 15/22; G10L 15/26
See application file for complete search history.

(56) References Cited

U.S. PATENT DOCUMENTS

| | | | | |
|---|---|---|---|---|
| 7,092,883 | B1* | 8/2006 | Gretter | G10L 15/08 |
| | | | | 704/E15.014 |
| 8,447,600 | B2* | 5/2013 | Cohen | G10L 15/187 |
| | | | | 704/231 |
| 9,645,988 | B1* | 5/2017 | Warren | G06F 16/3344 |
| 9,886,950 | B2* | 2/2018 | Karov | G06F 16/36 |
| 9,922,650 | B1* | 3/2018 | Secker-Walker | G10L 15/083 |
| 9,977,778 | B1 | 5/2018 | Perez et al. | |
| 10,089,983 | B1* | 10/2018 | Gella | G10L 15/32 |
| 10,242,667 | B2* | 3/2019 | Sharma | G06F 40/284 |
| 10,339,423 | B1* | 7/2019 | Dinerstein | G06F 40/205 |
| 10,482,182 | B1* | 11/2019 | Jankowski, Jr. | G06K 9/344 |
| 10,515,625 | B1* | 12/2019 | Metallinou | G10L 15/26 |
| 10,599,767 | B1* | 3/2020 | Mattera | G06F 40/242 |
| 10,811,013 | B1* | 10/2020 | Secker-Walker | G10L 15/26 |
| 11,138,374 | B1* | 10/2021 | Craft | G10L 15/22 |
| 2004/0148170 | A1* | 7/2004 | Acero | G06F 40/216 |
| | | | | 704/257 |
| 2004/0148179 | A1* | 7/2004 | Kumhyr | G06Q 30/02 |
| | | | | 705/1.1 |
| 2005/0080611 | A1* | 4/2005 | Huang | G10L 15/197 |
| | | | | 704/4 |
| 2006/0271364 | A1* | 11/2006 | Mirkovic | G06F 40/40 |
| | | | | 704/E15.014 |
| 2008/0071536 | A1* | 3/2008 | Nagashima | G10L 15/32 |
| | | | | 704/E15.001 |
| 2008/0098001 | A1* | 4/2008 | Gupta | G06F 16/258 |
| 2008/0235017 | A1* | 9/2008 | Satomura | G10L 15/22 |
| | | | | 704/E15.04 |
| 2010/0057463 | A1* | 3/2010 | Weng | G06F 40/20 |
| | | | | 704/257 |
| 2013/0262086 | A1* | 10/2013 | Kim | G06F 40/205 |
| | | | | 704/9 |
| 2017/0061956 | A1* | 3/2017 | Sarikaya | G10L 15/1815 |
| 2017/0315984 | A1* | 11/2017 | Goyal | G06F 40/205 |
| 2017/0372200 | A1* | 12/2017 | Chen | G10L 15/22 |
| 2018/0060282 | A1* | 3/2018 | Kaljurand | G06F 40/103 |
| 2018/0060301 | A1* | 3/2018 | Li | G06N 3/08 |
| 2018/0121415 | A1* | 5/2018 | Perez | G10L 15/08 |
| 2018/0131415 | A1* | 5/2018 | Bashirullah | A61B 5/0026 |
| 2018/0157638 | A1* | 6/2018 | Li | G06N 3/08 |
| 2018/0233143 | A1* | 8/2018 | Papangelis | G06F 16/3329 |
| 2019/0034795 | A1* | 1/2019 | Zitouni | G06F 16/90335 |
| 2019/0147853 | A1* | 5/2019 | Gunasekara | G06N 3/08 |
| | | | | 704/243 |
| 2019/0213284 | A1* | 7/2019 | Anand | G06F 9/453 |
| 2019/0258710 | A1* | 8/2019 | Biyani | G10L 15/26 |
| 2019/0259380 | A1* | 8/2019 | Biyani | G10L 15/19 |
| 2019/0333500 | A1* | 10/2019 | Kim | G10L 15/1815 |
| 2019/0362713 | A1* | 11/2019 | Asi | G06F 40/20 |
| 2019/0377619 | A1* | 12/2019 | Riva | G06N 5/022 |
| 2020/0152180 | A1* | 5/2020 | Lee | G06F 40/284 |
| 2020/0152184 | A1* | 5/2020 | Steedman Henderson | G06F 40/35 |
| 2020/0265830 | A1* | 8/2020 | Wang | G06N 3/084 |
| 2021/0217408 | A1* | 7/2021 | Hakkani-Tur | G10L 15/16 |

OTHER PUBLICATIONS

Xiao et al., "Distributed Word Representation Learning for Cross-Lingual Dependency Parsing", Proceedings of the Eighteenth Conference on Computational Language Learning, pp. 119-129. (Year: 2014).*
Henderson et al., "Robust dialog state tracking using delexicalised recurrent neural networks and unsupervised adaptation", 2014 IEEE Spoken Language Technology Workshop (SLT). (Year: 2014).*
Henderson et al., "Robust Dialog State Tracking Using Delexicalised Recurrent Neural Networks and Unsupervised Adaptation", IEEE, 2014. (Year: 2014).*
Wu et al., "End-to-End Recurrent Entity Network for Entity-Value Independent Goal-Oriented Dialog Learning", 2017. (Year: 2017).*
Qian et al., "Bert for Joint Intent Classification and Slot Filling", 2019. (Year: 2019).*
Rastogi et al., "Scalable Multi-Domain Dialogue State Tracking", 2017. (Year: 2017).*
Shin et al., "Slot Filling with Delexicalized Sentence Generation", Interspeech, 2018. (Year: 2018).*
Shin et al., "Utterance Generation With Variational Auto-Encoder for Slot Filling in Spoken Language Understanding", IEEE Signal Processing Letters, vol. 26, No. 3, Mar. 2019 (Year: 2019).*
International Search Report and Written Opinion of the International Searching Authority in connection with International Patent Application No. PCT/KR2020/001665 dated May 19, 2020, 11 pages.
Liu et al., "Attention-Based Recurrent Neural Network Models for Joint Intent Detection and Slot Filling", Interspeech 2016, Sep. 2016, 5 pages.
Azaria et al., "Instructable Intelligent Personal Agent", Association for the Advancement of Artificial Intelligence, 2016, pp. 2681-2689.
Supplementary European Search Report dated Jul. 21, 2022 in connection with European Patent Application No. 20833281.7, 12 pages.
Rastogi et al., "Scalable Multi-Domain Dialogue State Tracking," 2017 IEEE Automatic Speech Recognition and Understanding Workshop, Dec. 2017, 8 pages.
Shin et al., "Slot Filling with Delexicalized Sentence Generation," Interspeech 2018, Sep. 2018, 5 pages.
Wikipedia, "Approximate string matching," May 2012, 4 pages.
Wu et al., "End-to-End Recurrent Entity Network for Entity-Value Independent Goal-Oriented Dialog Learning," Dialog System Technology Challenges—DSTC6, Dec. 2017, 5 pages.
Ray et al., "Interactive Delexicalization for Improved Spoken Language Understanding," Interspeech 2019, Oct. 2019, 9 pages.

* cited by examiner

SYSTEM AND METHOD FOR NATURAL LANGUAGE UNDERSTANDING

CROSS-REFERENCE TO RELATED APPLICATION AND CLAIM OF PRIORITY

This application claims priority under 35 U.S.C. § 119(e) to U.S. Provisional Patent Application No. 62/866,755 filed on Jun. 26, 2019 and entitled "Method for Robust and Natural Language Understanding." This provisional patent application is hereby incorporated by reference in its entirety.

TECHNICAL FIELD

This disclosure relates generally to machine learning systems. More specifically, this disclosure relates to a system and method for natural language understanding.

BACKGROUND

Natural language understanding (NLU) is a key component of modern digital personal assistants (PA) to enable them to convert a user's natural language (NL) commands to actions. Parsers or NLU models enable this by converting NL commands to suitable intents and slot labels. An intent determines the action to perform, and slot words or phrases provide parameters for the action. However, current parsers typically do not work well in extracting certain slots/entities with large semantic variability, such as message texts or partial movie names. Moreover, distribution of certain slot entities changes over time, such as movie names or actor names, and these new entities are unknown to the PA and are harder to identify. Modern PAs often require regeneration of training data and frequent retraining of an NLU engine to enable understanding of such new entities, which is time consuming, expensive, and inefficient.

SUMMARY

This disclosure provides a system and method for natural language understanding.

In a first embodiment, a method includes processing an utterance using a trained model. The method also includes replacing a first portion of the utterance with a first token, where the first token represents a semantic role of the first portion of the utterance based on a slot vocabulary. The method further includes determining a slot value in the utterance based on the first token. In addition, the method includes performing a task corresponding to the utterance based on the determined slot value.

In a second embodiment, an electronic device includes at least one memory and at least one processor coupled to the at least one memory. The at least one processor is configured to process an utterance using a trained model. The at least one processor is also configured to replace a first portion of the utterance with a first token, where the first token represents a semantic role of the first portion of the utterance based on a slot vocabulary. The at least one processor is further configured to determine a slot value in the utterance based on the first token. In addition, the at least one processor is configured to perform a task corresponding to the utterance based on the determined slot value.

In a third embodiment, a non-transitory computer readable medium embodies a computer program. The computer program includes instructions that when executed cause at least one processor of an electronic device to process an utterance using a trained model. The computer program also includes instructions that when executed cause the at least one processor to replace a first portion of the utterance with a first token, where the first token represents a semantic role of the first portion of the utterance based on a slot vocabulary. The computer program further includes instructions that when executed cause the at least one processor to determine a slot value in the utterance based on the first token. In addition, the computer program includes instructions that when executed cause the at least one processor to perform a task corresponding to the utterance based on the determined slot value.

In a fourth embodiment, a method for training a model for natural language understanding (NLU) includes providing an NLU training dataset and a slot vocabulary. The method also includes generating a partially delexicalized training dataset using the NLU training dataset and the slot vocabulary. The method further includes generating a combined training dataset by combining the NLU training dataset and the partially delexicalized training dataset. In addition, the method includes training a model using the combined training dataset.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B,"

"at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
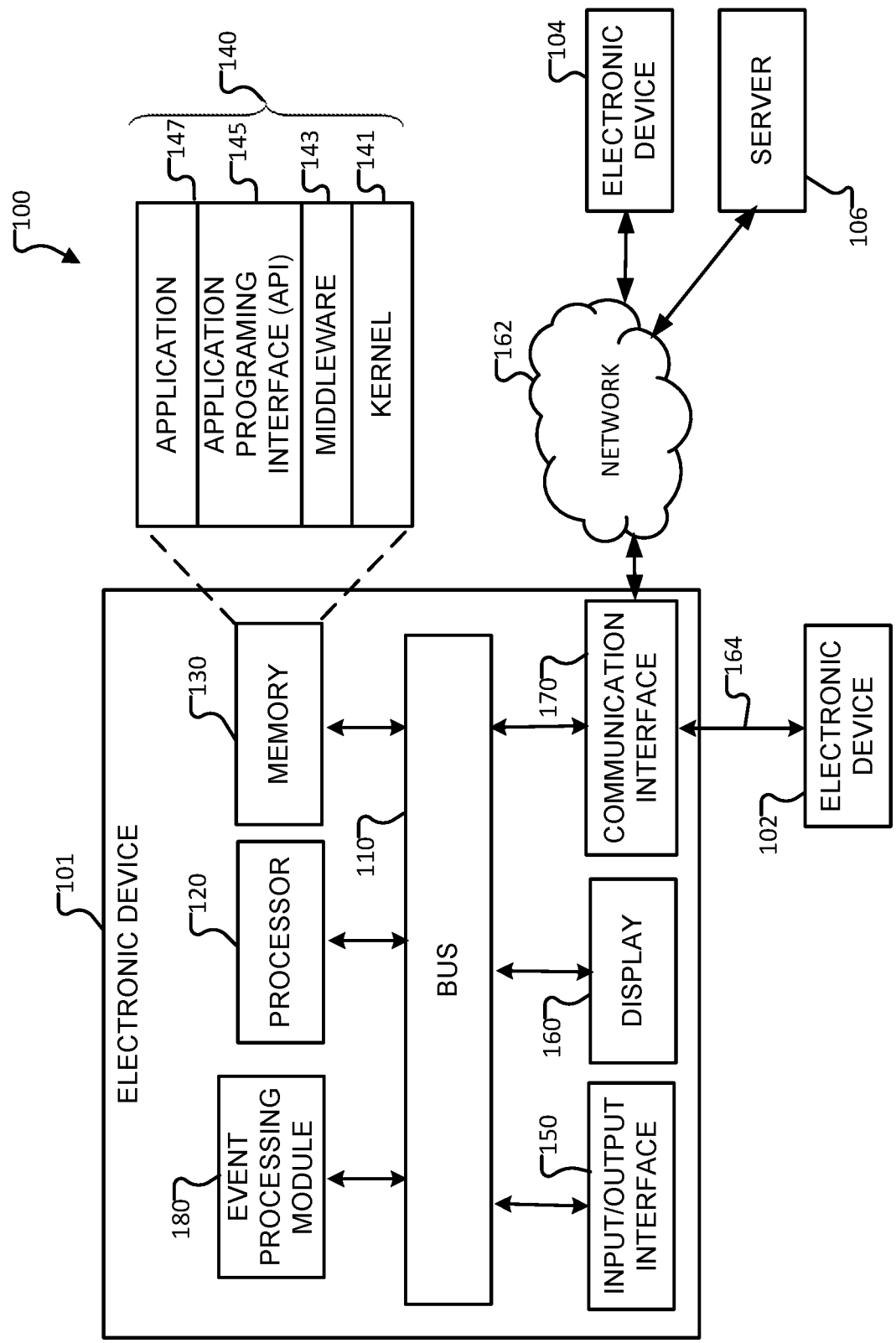
FIG. 1 illustrates an example network configuration in accordance with various embodiments of this disclosure.

FIGS. 1 through 13, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, current parsers typically do not work well in extracting certain slots/entities with large semantic variability, such as message texts or partial movie names. Moreover, distribution of certain slot entities changes over time, such as movie names or actor names. These new entities can be unknown to a personal assistant (PA) and thus are harder to identify. Modern PAs often require regeneration of training data and frequent retraining of a natural language understanding (NLU) engine to enable understanding of such new entities, which is time consuming, expensive, and inefficient. Current digital personal assistants can convert a user's natural language (NL) commands into appropriate actions, and an NLU engine or a parser plays a key role in this conversion by identifying intent and slots from the user's NL command/utterance. An intent determines the action to perform, and slots determine the parameters for the action. For example, the command "Send message to Alice wishing Happy Birthday" has an intent "send_message" and slots "(@contact, Alice)" and "(@message, happy birthday)."

Various embodiments of this disclosure provide a robust hybrid NLU model that performs delexicalization of certain slots with open vocabulary and large semantic variability. In effect, this improves the identification of slots or entities in a user's natural language commands, enabling a PA to be more efficient in executing user requests. The various embodiments of this disclosure also improve identification of slot terms with large semantic variability over existing models by learning from the uncertainty of the model. A hybrid NLU model of the various embodiments of this disclosure can achieve better NLU performance than existing models. Various embodiments of this disclosure also provide hybrid NLU model training. In various embodiments, training a hybrid NLU model includes generating a partial delexicalized NLU dataset from an original NLU training dataset by replacing slot words or phrases in the original NLU training dataset with special tokens from a slot vocabulary knowledge base. In some embodiments, the slot words or phrases in the original NLU training dataset are replaced with special tokens randomly, such as randomly choosing which word or phrase in a training sample to replace with a special token. The partial delexicalized NLU dataset is combined with the original NLU training dataset, and the combined dataset is used to train a probabilistic NLU model jointly for intent and slot determination.

Various embodiments of this disclosure also provide a hybrid NLU model that receives a query and creates delexicalized candidates from the query by partially delexicalizing the query, such as by matching words or phrases in the query with words or phrases in a slot vocabulary knowledge base and replacing the matched words or phrases in the query with special tokens associated with the words or phrases in the slot vocabulary knowledge base. Multiple candidates can be created, where some candidates are the query with one or more words or phrases replaced with special tokens and other candidates are the original query. The candidates are parsed by a trained hybrid NLU model, which provides parse results including determined slot tags and/or intent and an entropy score for each word or phrase in the query. The entropy scores can be used to determine an overall confidence score for a specific candidate. After all candidates are parsed, the candidate with the highest overall confidence score can be used to provide the slot tags for the query.

Various embodiments of this disclosure further provide for a personalized delexicalization service that can be executed on an electronic device that communicates with a host device, where the host device executes the hybrid NLU model and receives queries from the electronic device. The personalized delexicalization service can generate additional delexicalized candidates by using data stored on the electronic device, such as a contact list, music library, or other data, to create a personalized slot vocabulary knowledge base. The personalized slot vocabulary knowledge base can be used to replace words or phrases in a query with special tokens from the personalized slot vocabulary knowledge base. Various embodiments of this disclosure also provide for continuous natural language understanding of a PA so that the PA can keep learning new concepts and entities over time and become more personalized without requiring expensive model retraining. A continuous NLU model includes a slot verification service that can be executed on the electronic device that runs a personalized delexicalization service. The slot verification service verifies whether an output slot value is correct or not, and this verification is used to further train a hybrid NLU model.

FIG. 1 illustrates an example network configuration 100 in accordance with various embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network environment 100. The electronic device 101 can include at least one of a bus 110, a processor 120, a memory 130, an input/output (IO) interface 150, a display 160, a communication interface 170, or an event processing module 180. In some embodiments, the electronic device 101 may exclude at least one of the components or may add another component.

The bus 110 includes a circuit for connecting the components 120 to 180 with one another and transferring communications (such as control messages and/or data) between the components. The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor can be a graphics processor unit (GPU). In accordance with various embodiments of this disclosure, the processor 120 can train or execute machine learning models, such as by training machine learning models on datasets including partially delexicalized samples, receiving natural language queries, delexicalizing natural language queries, parsing partially delexicalized natural language queries, determining query candidates for use in slot tagging and intent determination, providing slot tags and intent for a query, performing actions based on the query and the determined slot tags and intent for the query, or performing other tasks.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS). In some embodiments, the memory 130 can be an external memory used by a model, which may be stored on the electronic device 101, an electronic device 102, an electronic device 104, or a server 106.

The kernel 141 can control or manage system resources (such as the bus 110, processor 120, or a memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 can include an application that receives queries, delexicalizes the query to create one or more delexicalized candidates, parses the candidates, determines intent and slot tags from at least one of the parsed candidates, and executes an action based on the determined intent and slot tags. In some embodiments, the application 147 can also perform tasks such as a personalized delexicalization service and/or a slot verification service.

The middleware 143 can function as a relay to allow the API 145 or the application 147 to communicate data with the kernel 141, for example. A plurality of applications 147 can be provided. The middleware 143 is able to control work requests received from the applications 147, for example, by allocating the priority of using the system resources of the electronic device 101 (such as the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (such as a command) for filing control, window control, image processing or text control.

The IO interface 150 serves as an interface that can, for example, transfer commands or data input from a user or other external devices to other component(s) of the electronic device 101. Further, the IO interface 150 can output commands or data received from other component(s) of the electronic device 101 to the user or the other external device.

The display 160 may include, for example, a liquid crystal display (LCD), a light emitting diode (LED) display, an organic light emitting diode (OLED) display, a quantum light emitting diode (QLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as signals received by the communication interface 170 regarding natural language queries, signals regarding determined intent and slot tags, signals regarding actions to be performed based on a natural language query and associated determined intent and slot tags, or other signals.

The electronic device 101 further includes one or more sensors that can meter a physical quantity or detect an activation state of the electronic device 101 and convert metered or detected information into an electrical signal. For example, a sensor can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) can further include a control circuit for controlling at least one of the sensors included therein. Any of these sensor(s) can be located within the electronic device 101.

The wireless communication is able to use at least one of, for example, long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function, according to embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. The server 106 can also include an event processing module (not shown) that may support the event processing module 180 implemented in the electronic device 101. For example, the event processing module 180 can process at least a part of information obtained from other elements (such as the processor 120, the memory 130, the input/output interface 150, or the communication interface 170) and can provide the same to the user in various manners.

While in FIG. 1 the event processing module 180 is shown to be a module separate from the processor 120, at least a portion of the event processing module 180 can be included or implemented in the processor 120 or at least one other module, or the overall function of the event processing module 180 can be included or implemented in the processor 120 or another processor. The event processing module 180 can perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
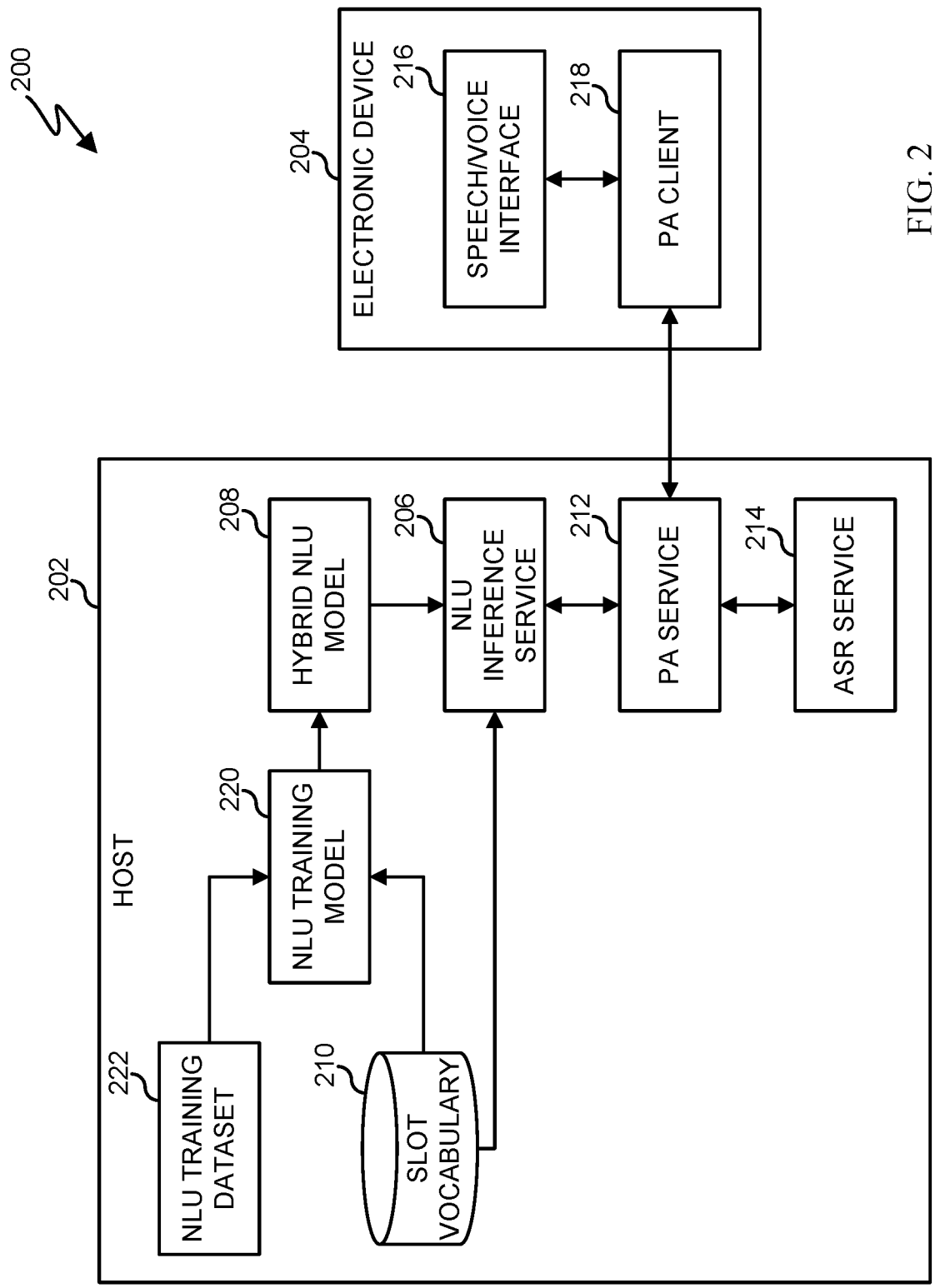
FIG. 2 illustrates an example natural language understanding (NLU) system in accordance with various embodiments of this disclosure.

FIG. 2 illustrates an example NLU system 200 in accordance with various embodiments of this disclosure. The system 200 includes at least one host device 202 and at least one electronic device 204. In some embodiments, the host device 202 can be the server 106, and the electronic device 204 can be the electronic device 101. The host device 202 includes an NLU inference service 206 that utilizes a hybrid NLU model 208 and a slot vocabulary 210 to process queries received by a PA service 212 executed by the host device 202. The PA service 212 cooperates with an automated speech recognition (ASR) service 214 to receive queries or utterances from the electronic device 204. The electronic device 204 includes a speech/voice interface 216 configured to receive queries or utterances from a user of the electronic device 204. A PA client 218 receives the queries or utterances from the speech/voice interface 216 and transmits the queries or utterances from the electronic device 204 to the PA service 212 at the host device 202.

The PA service 212 uses the ASR service 214 to convert the voice or speech data received from the PA client 218 into text utterance data for use by the NLU inference service 206. The NLU inference service 206 is configured to determine an intent and parameters for the query or utterance that define how to fulfill the user's request. Once the task or action to be performed is determined by the NLU inference service 206, the PA service 212 can instruct the PA client 218 on the task or action to be performed, which can be performed either by the PA service 212 or by the PA client 218. The results are presented to the user by the PA client 218 on the electronic device 204. The determined parameters to be used for the query are based on the utterance data, which is processed by the NLU inference service 206 and the hybrid NLU model 208 to determine the parameters. The parameters can include determined slots or slot tags that identify semantic associations of a word, a phrase, or multiple words or phrases in the utterance data, which are typically domain-specific.

Once each of the appropriate words or phrases in the utterance are assigned slots, the PA service 212 can carry out or instruct the execution of a task or action based on the intent and the slot tags. For example, if the utterance data includes "send_message to Alice wishing happy birthday," the NLU inference service 206, using the slot vocabulary 210 and the hybrid NLU model 208, can determine the utterance has an intent "send_message" and can tag the word "Alice" with a slot tag of "(@contact, Alice)" and the phrase "happy birthday" with a slot tag of "(@message, happy birthday)." Slot filling can also use IOB format, such as by tagging "Alice" as "B-contact," "happy" as "B-message," and "birthday" as "I-message." It will be understood that the determined intent can affect how the slots are filled using the utterance data.

The hybrid NLU model 208 is configured to identify slots using delexicalization. Delexicalization refers to a process of replacing words or phrases in an utterance with a token that represents the semantic role of the replaced word(s) or phrase(s). For example, the utterance "send message to Alice wishing happy birthday" can be delexicalized into the utterance "send message to <contact> wishing <message>," where <contact> and <message> are the tokens. In various embodiments of this disclosure, delexicalization assists with slot filling by reducing the semantic variability of high variability slot types to enable improved detection of such slots. For instance, high variability slots can include utterance words or phrases such as message text, movie names, or names of people or places in different contexts. The hybrid NLU model 208 is configured to iteratively delexicalize input utterances. In various embodiments of this disclosure, the hybrid NLU model 208 uses a combination of delexicalization and a probabilistic NLU model, such as a neural network, to fill slots for utterances.

To at least partially delexicalize utterances, the hybrid NLU model 208 uses the slot vocabulary 210 to replace words or phrases in utterances with tokens. The slot vocabulary 210 is a knowledge base of words or phrases and associated tokens. The slot vocabulary includes data different from training data, and is domain-dependent. In various embodiments of this disclosure, every slot word or phrase in the slot vocabulary 210 has a corresponding special delexicalization token. For example, if the word "Alice" is in the slot vocabulary 210, the word "Alice" has a corresponding special token, such as <contact>. This special token may not always correspond to the slot name, such as @contact, and may depend on the semantic type of the slot, the domain, and the relationship of the slot with other slots in the domain. As another example, in a travel domain, a city "San Francisco" can be both @destination-city and @source-city slots, but it may have a single special delexicalization token <city>. The NLU model 208 can refer to the slot vocabulary 210 to initially string match one or more words or phrases in an utterance with words or phrases in the slot vocabulary associated with a token and replace the word or phrase in the utterance with the matching token. The NLU model 208 can iteratively parse the utterance, now including one or more tokens, to determine slots for each word or phrase. The NLU model 208 can further delexicalize the utterance based on parsing results and parse the further delexicalized utterance to determine additional slots or reinforce or improve the confidence in previously-assigned slots.

The hybrid NLU model 208 is trained from an NLU training model 220. The NLU training model 220 uses the slot vocabulary 210 and an NLU training dataset 222 during training to learn the semantic relationship between words or phrases in utterances, as well as the relationships between words or phrases and the special tokens introduced by delexicalization. In various embodiments of this disclosure, the NLU training dataset 222 used during training is a combined training dataset that includes normal training utterances and delexicalized training utterances that are constructed using an annotated NLU training dataset and the slot vocabulary 210. The trained NLU model 208 provides an advantage over other NLU models because delexicalization of certain words of phrases in utterances provides for a more efficient and accurate NLU model by providing for increased confidence in slot filling for slot types with high variability.

Although FIG. 2 illustrates one example of an NLU system 200, various changes may be made to FIG. 2. For example, in some embodiments, the PA service 212, the ASR service 214, the NLU inference service 206, and the hybrid NLU model 208 can be performed or reside on different devices, such as part of a distributed networked computing environment. Additionally, the training of the NLU model 208 can be performed by a different device other than the device on which the NLU model 208 is implemented, such as to assist the NLU inference service 206 in fulfilling queries or commands received via the PA service 212.

Figure 3:
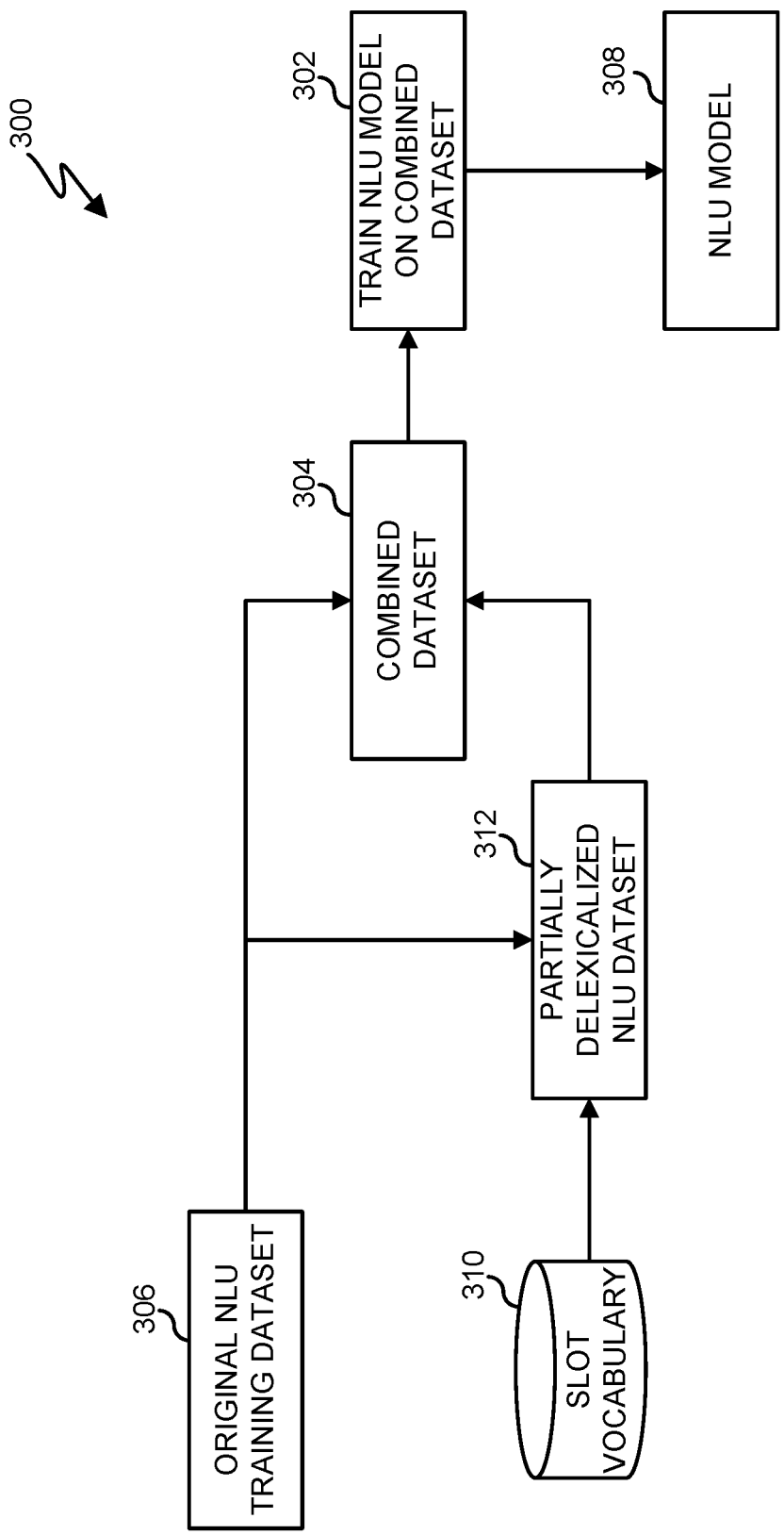
FIG. 3 illustrates an example hybrid NLU model training process in accordance with various embodiments of this disclosure.

FIG. 3 illustrates an example hybrid NLU model training process 300 in accordance with various embodiments of this disclosure. For ease of explanation, the process 300 may be described as being executed or otherwise used by the processor(s) 120 of any of the electronic devices 101, 102, 104 or the server 106 in FIG. 1. However, the process 300 may be used by any suitable device(s) and in any suitable system.

The process 300 includes training an NLU model at block 302 from a combined training dataset 304 and outputting a trained NLU model 308. The combined training dataset 304 is created using an original NLU training dataset 306, such as a training set of annotated sample utterances, and a slot vocabulary 310. The slot vocabulary 310 is a knowledge base of words or phrases and associated tokens. In various embodiments of this disclosure, every slot word or phrase in the slot vocabulary 310 has a corresponding special delexicalization token.

For multiple utterances in the original NLU training dataset 306, in some embodiments, one or more words or phrases in each of the plurality of utterances are replaced with a token from the slot vocabulary 310. For example, suppose the original NLU training dataset 306 includes an annotated utterance of "send message to {Alice|@contact} wishing {Happy Birthday|@message}." Using the slot vocabulary 310 to find matching tokens for the slot types in the utterance, the utterance can be partially delexicalized to generate a training sample of "send message to {Alice|@contact} wishing {<message>|@message}." Alternatively, the training sample could instead be partially delexicalized as "send message to {<contact>|@contact} wishing {Happy Birthday|@message}."

In some embodiments, more than one word or phrase can be replaced with a token. Also, in some embodiments, the words or phrases with matching tokens to be replaced in an utterance can be chosen randomly such that, in the above example, the process 300 chooses whether to replace "Alice" or "Happy Birthday" with a token randomly. Further, in some embodiments, the process 300 can set a probability of replacing one or more words or phrases, such as setting a 75% probability of choosing to replace one or more words or phrases. While the original NLU training dataset 306 contains annotated utterances, the slot vocabulary 310 may contain a number of alternative slot values that may not all appear in the original NLU training dataset 306, such as movie or show names from a certain year range.

As utterances from the original NLU training dataset 306 are partially delexicalized, these partially delexicalized utterances are stored as a partially delexicalized NLU dataset 312. To create the combined dataset 304 to be used for training the NLU model 308, the original NLU training dataset 306 is combined with the partially delexicalized NLU dataset 312 such that the combined dataset 304 includes both partially delexicalized training samples and annotated training samples from the original NLU training dataset 306. The training phase thus includes training the NLU model 308 with the combined dataset 304 that includes utterances both with and without special delexicalized tokens. After training, the NLU model 308 learns the semantic relationships between words or phrases in utterances, as well as the relationships between words or phrases and the special tokens introduced by delexicalization. During the inference or deployment phase, training on this combined dataset 304 helps the NLU model 308 to understand the appropriateness of the delexicalization of words or phrases by observing model confidence or uncertainty and using it to iteratively improve delexicalization and therefore the parsing. In some embodiments, the slot vocabulary 310 is includes data different from the training data, and is domain-dependent. Every slot word or phrase in the slot vocabulary 310 has a corresponding special delexicalization token. For example, the word "Alice" may have a corresponding special token <contact>. This special token may not always correspond to the slot name and may depend on the semantic type of the slot, the domain, and the relationship of the slot with other slots in the domain. As an example, in a travel domain, a city "San Francisco" can be both @destination-city, and @source-city slots, but it may have a single special delexicalization token <city>.

Although FIG. 3 illustrates one example of a hybrid NLU model training process 300, various changes may be made to FIG. 3. For example, while shown as a series of steps, various steps in FIG. 3 can overlap, occur in parallel, occur in a different order, or occur any number of times. Also, the NLU model 308 can be the model used during deployment of services and can be the hybrid NLU model 208 of FIG. 2, and the slot vocabulary 310 can be the slot vocabulary 210 of FIG. 2.

Figure 4:
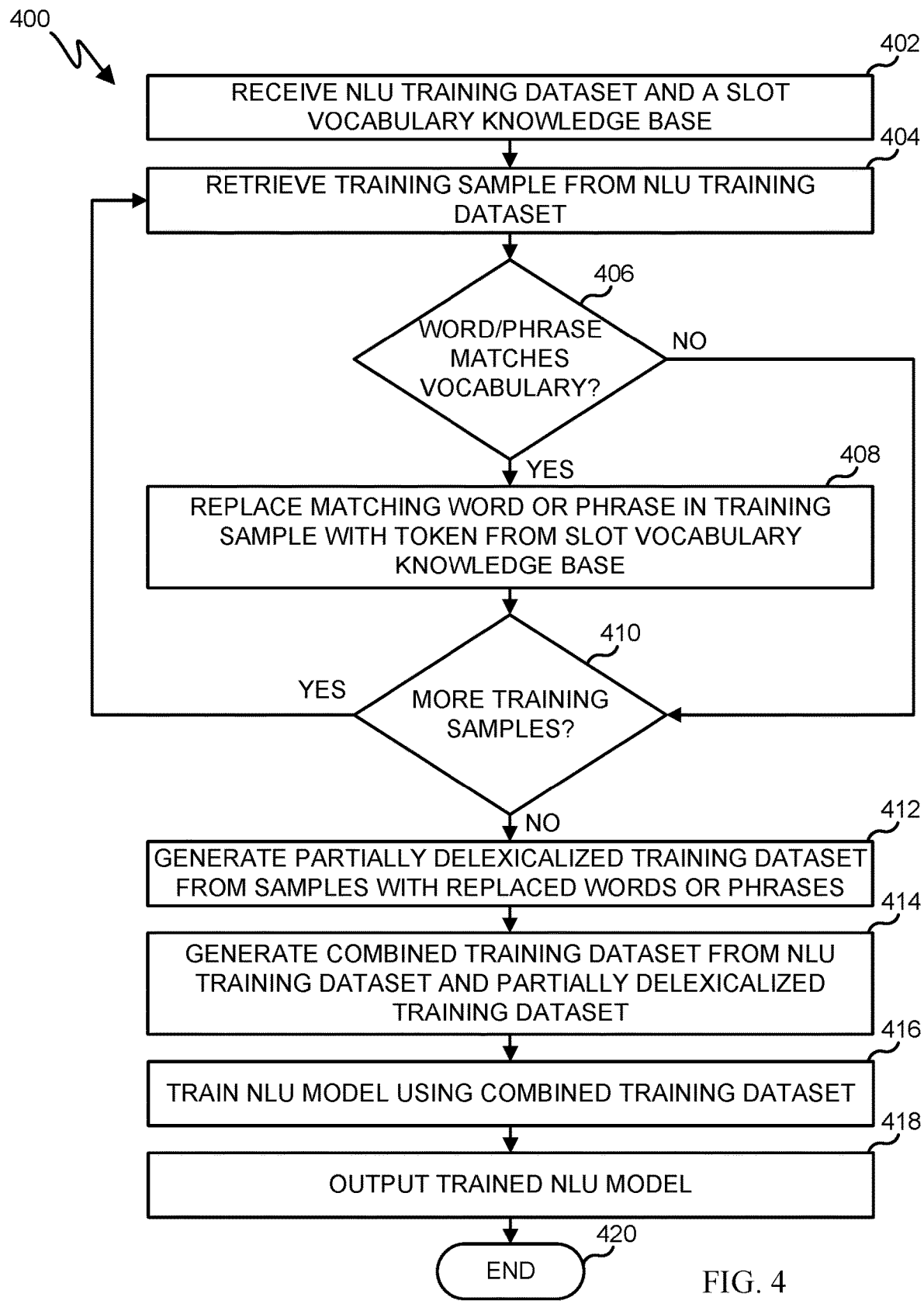
FIG. 4 illustrates an example hybrid NLU training process in accordance with various embodiments of this disclosure.

FIG. 4 illustrates an example hybrid NLU training process 400 in accordance with various embodiments of this disclosure. The process 400 can be used to train a hybrid NLU model as described with respect to the various embodiments of this disclosure, such as the hybrid NLU model 208 or 308. For ease of explanation, the process 400 may be described as being executed or otherwise used by the processor(s) 120 of any of the electronic devices 101, 102, 104 or the server 106 in FIG. 1. However, the process 400 may be used by any suitable device(s) and in any suitable system.

At block 402, a processor receives an NLU training dataset T and a slot vocabulary knowledge base $V_s$. In some embodiments, the NLU training dataset T can be the original NLU training dataset 306, and the slot vocabulary $V_s$ can be the slot vocabulary 210 or 310. At block 404, the processor retrieves a training sample from the NLU training dataset T, such as an utterance annotated with slot tags. At decision block 406, the processor determines whether any words or phrases in the training sample matches a word or phrase in the slot vocabulary $V_s$. If not, the process 400 moves to decision block 410.

If so, at block 408, the processor can replace the matching word or phrase in the training sample with a corresponding token from the slot vocabulary $V_s$. For example, for a sample utterance of "send message to {Alice|@contact} wishing {Happy Birthday|@message}" using the slot vocabulary $V_s$ to find matching tokens for the slot types in the utterance, the utterance can be partially delexicalized to generate a training sample of "send message to {Alice|@contact} wishing {<message>|@message}." Alternatively, the training sample could instead be partially delexicalized as "send message to {<contact>|@contact} wishing {Happy Birthday|@message}." In some embodiments, more than one word or phrase can be replaced with a token. Also, in some embodiments, the words or phrases with matching tokens to be replaced in an utterance can be chosen randomly such that, in the above example, the processor chooses whether to replace "Alice" or "Happy Birthday" with a token randomly. When replacing tokens randomly, some utterances in the NLU training dataset T may not be partially lexicalized. In some embodiments, the processor can use a set probability for replacing one or more words or phrases, such as a 75% probability of choosing to replace one or more words or phrases. While the NLU training dataset T contains annotated utterances, the slot vocabulary $V_s$ may contain a number of alternative slot values that may not all appear in the original NLU training dataset T, such as movie or show names from a certain year range. The process 400 then moves to decision block 410.

At decision block 410, the processor determines if there are more training samples in the NLU training dataset T that have not yet been retrieved for delexicalization. If so, the process 400 loops back to block 404 to retrieve another training sample from the NLU training dataset T for possible delexicalization. If the processor determines that there are no more training samples or if the processor determines that a threshold number of partially delexicalized samples have been created at decision block 410, the process 400 moves to block 412. At block 412, the processor generates a partially delexicalized training dataset $T_d$ including each of the delexicalized sample utterances created using blocks 404-410. At block 414, the processor generates a combined training dataset $T_c$ by combining the NLU training dataset T with the partially delexicalized training dataset $T_d$. In some embodiments, the partially delexicalized dataset $T_d$ and the combined training dataset $T_c$ can be the partially delexicalized NLU dataset 312 and the combined dataset 304 of FIG. 3, respectively.

At block 416, the processor trains an NLU model or parser P using the combined training dataset $T_c$. In some embodiments, the NLU model or parser P can be the NLU model 208 or 308. The training phase thus includes training the NLU model or parser P with the combined dataset including utterances both with and without special delexicalized tokens. Due to the training, the NLU model or parser P will learn the semantic relationships between words or phrases in utterances, as well as the relationships between words or phrases and the special tokens introduced by delexicalization. During the inference or deployment phase, previous training using the combined dataset $T_c$ helps the NLU model or parser P to understand the appropriateness of the delexicalization of words or phrases by observing model confidence or uncertainty and using it to iteratively improve delexicalization and therefore the parsing. At block 418, the processor outputs the trained NLU model or parser P. The process 400 ends at block 420.

Although FIG. 4 illustrates one example of hybrid NLU training process 400, various changes may be made to FIG. 4. For example, while shown as a series of steps, various steps in FIG. 4 can overlap, occur in parallel, occur in a different order, or occur any number of times. Also, the process 400 can include, such as at decision block 406 and block 408, a random determination of whether to replace a matched word or phrase with a token. Further, generating the partially delexicalized training dataset at block 412 can occur during blocks 404-410, such as initializing the partially delexicalized training dataset and adding each delexicalized utterance created at block 408 to the partially delexicalized training dataset as the process 400 loops among blocks 404-410.

Figure 5:
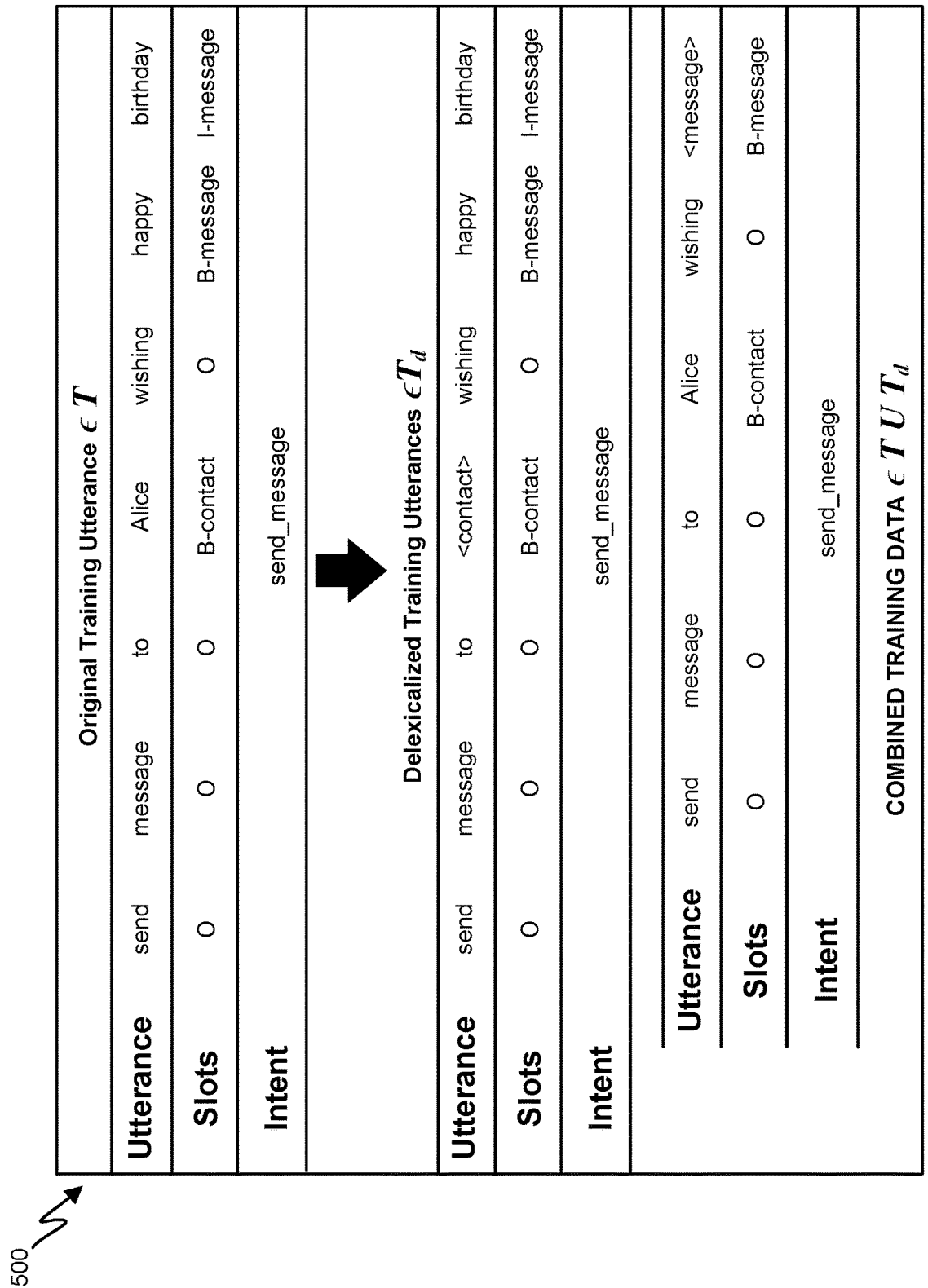
FIG. 5 illustrates an example training sample utterance in accordance with various embodiments of this disclosure.

FIG. 5 illustrates an example training sample utterance 500 in accordance with various embodiments of this disclosure. The example utterance 500 includes an original training utterance ∈T. The original training utterance ∈T can be an utterance included in an annotated NLU training dataset, such as the original NLU training dataset 306 in FIG. 3. As shown in FIG. 5, the original training utterance ∈T includes an utterance of "send message to Alice wishing happy birthday" with the word "Alice" annotated with a "B-contact" slot type, the word "happy" annotated with a "B-message" slot type, and the word "birthday" annotated with an "I-message" slot type. The original training utterance ∈T can be partially delexicalized one or more times to create one or more delexicalized training utterances ∈T$_d$. For example, as shown in FIG. 5, the original training utterance ∈T is delexicalized into an utterance of "send message to <contact> wishing happy birthday" with the <contact> token replacing "Alice" and retaining the "B-contact" annotation for training. In some cases, multiple words or phrases in a training sample can be replaced with tokens.

In some embodiments, a training sample can be delexicalized into more than one delexicalized training utterance. For example, as shown in FIG. 5, the original training utterance ∈T is also delexicalized into another delexicalized training utterance of "send message to Alice wishing <message>" with the <message> token replacing "happy birthday" and retaining the "B-message" annotation for training. Additional delexicalized training utterances can be created if the sample utterance includes additional words or phrases that can be replaced with tokens. It will be understood that a similar process can be used to delexicalize other sample utterances. After delexicalization of the sample utterances, a combined dataset can be created from the original training utterance or utterances ∈T and the delexicalized training utterances ∈T$_d$. The combined training data can be defined as ∈T ∪T$_d$ such that the combined training data includes the original utterance and each unique delexicalized training utterance.

Although FIG. 5 illustrates one example of training sample utterance 500, various changes may be made to FIG. 5. For example, multiple original training utterances can be used to create, from each of the original training utterances, one or more delexicalized training utterances. The combined training data can thus provide for a multiplied number of training utterances from the original training utterances, as each training utterance may provide multiple delexicalized training utterances to be used during training. The training utterances can also be from various domains. For example, a travel domain utterance of "book a flight from {New York|@source-city} to {San Francisco|@destination-city}" can be delexicalized into multiple delexicalized utterances, such as "book a flight from {<city>|@source-city} to {San Francisco|@destination-city}," "book a flight from {New York|@source-city} to {<city>|@destination-city}," and/or "book a flight from {<city>|@source-city} to {<city>|@destination-city}," to create a set of delexicalized utterances to be used with the original training utterance during training of the hybrid NLU model.

Figure 6:
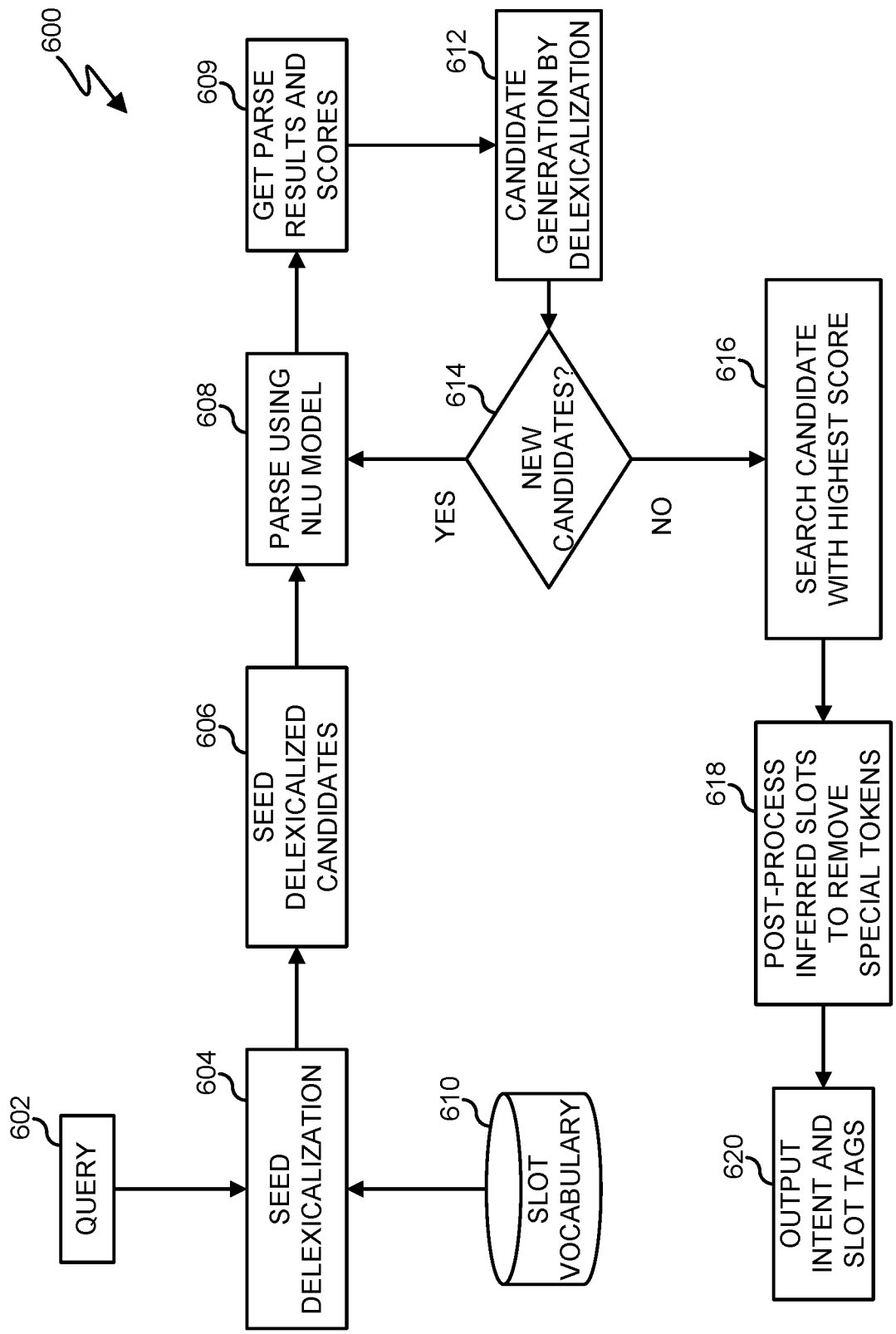
FIG. 6 illustrates an example hybrid NLU model inference process in accordance with various embodiments of this disclosure.

FIG. 6 illustrates an example hybrid NLU model inference process 600 in accordance with various embodiments of this disclosure. For ease of explanation, the process 600 may be described as being executed or otherwise used by the processor(s) 120 of any of the electronic devices 101, 102, 104 or the server 106 in FIG. 1. The process 600 can also be used as part of the system 200, such as part of the NLU inference service 206 using the hybrid NLU model 208. However, the process 600 may be used by any suitable device(s) and in any suitable system.

The process 600 includes receiving a query 602. The query 602 can be an utterance, such as a question or a command from a user, that is converted from original voice data to text so that the utterance can be at least partially delexicalized and parsed by an NLU model, such as the NLU model 208 or 308. At block 604, a seed delexicalization module, using a slot vocabulary 610, partially delexicalizes the query 602 by string-matching words or phrases in the query 602 with slot words or phrases in the slot vocabulary 610. In some embodiments, words and phrases to be delexicalized in the query 602 can be prioritized or ordered, such as by matching words or phrases in the order of longest to shortest. For example, if the query 602 includes the utterance "post message to Bob happy new year," separate delexicalized utterances could be created, such as "post message to <contact> happy new year" and "post message to Bob <message>," depending on which words or phrases are found in the slot vocabulary 610. As a particular example, the slot vocabulary 610 may only include the word "Bob" and not the phrase "happy new year," in which case the phrase "happy new year" would not be delexicalized. In some embodiments, a delexicalized sample having multiple tokens can also be created. Also, in some embodiments, if a match is found in the slot vocabulary 610, two candidates can be generated based on the match, one candidate that includes a word or phrase replaced with a token and another candidate that includes an utterance without replacing any words or phrases with tokens.

Once the query 602 is seeded with tokens based on the matching of words or phrases with words or phrases in the slot vocabulary 610, at block 606, the created delexicalized utterances are seeded as delexicalized candidates for use by the NLU model. At block 608, the NLU model parses the candidates, which can include both partially delexicalized utterances and the original utterance. At block 609, the NLU model outputs parse results and scores based on the slot results. For example, the parse results can include slot tags determined by the NLU model for each word or phrase for each candidate, as well as entropy scores for each word or phrase. In some embodiments, the entropy scores can each be a number between 0 and 1 (inclusive), with numbers closer to 0 indicating a higher confidence in the parse result and numbers closer to 1 indicating a lower confidence in the parse result. The parse results and scores are provided for each candidate seeded at block 606.

At block 612, a candidate generation by delexicalization module can generate a new set of candidates by using the parse results and the entropy scores of the first set of candidates created at block 606 and parsed at block 608. In some embodiments, the new set of candidates is created by analyzing each original candidate and its parse results and scores and by using a set of domain-independent rules to potentially generate one or more new candidates from the original candidate. For example, in some embodiments, a set of high variability slot types can be tracked, where these high variability slot types are slot types that can be associated with words or phrases that are highly variable in content, such as a @message slot type. For slot types from the high variability slot types, at block 612 the processor can delexicalize all such identified slot words or phrases in the parsed candidate by replacing the identified words or phrases with a corresponding special token if the identified words or phrases already do not contain any special tokens. As another example, in some embodiments, for any special token in the parsed candidate that corresponds to one or more slot types from the set of the high variability slot types, at block 612, the processor can remove one or more contiguous words or phrases on the left or right of the special token if the contiguous words or phrases have slot entropy scores higher than an uncertainty threshold and if the contiguous words or phrases are not special tokens themselves. If a parsed candidate does not meet any of the domain-independent rules, no new candidates may be created from that particular parsed candidate. The domain-independent rules can be applied to each parsed candidate output by the NLU model using the original candidates created at block 606 to potentially create multiple new candidates.

At decision block 614, if the processor determines that there are new candidates created at block 612, the process moves back to block 608 to parse these new candidates using the trained NLU model. The processor can continue parsing candidates, outputting parse results and scores, and creating new candidates to be parsed using the domain-independent rules until no new candidates are created. If the processor determines that there are no new candidates created by the candidate generation by delexicalization module at decision block 614, the process moves to block 616. At block 616, the processor computes a total confidence score for each candidate and searches all parsed candidates for the candidate with the best or highest score. In some embodiments, the total score for each candidate can be the inverse of the average of each entropy score for the slot words or phrases in the candidate. At block 618, the processor post-processes the inferred or extracted slots from the candidate with the highest confidence score to recover the slots for the original query 602 by lexicalization, such as by replacing the special tokens in the candidate with the highest score with the original words or phrases from the query 602. At block 620, the processor outputs the intent and slot tags to be used in fulfilling one or more actions based on the query 602.

Although FIG. 6 illustrates one example of a hybrid NLU model inference process 600, various changes may be made to FIG. 6. For example, while shown as a series of steps, various steps in FIG. 6 can overlap, occur in parallel, occur in a different order, or occur any number of times. As a particular example, the processor can calculate the total confidence score for each candidate at block 609 once the parse results and the entropy scores are received, or this can occur at another block prior to block 616.

Figure 7:
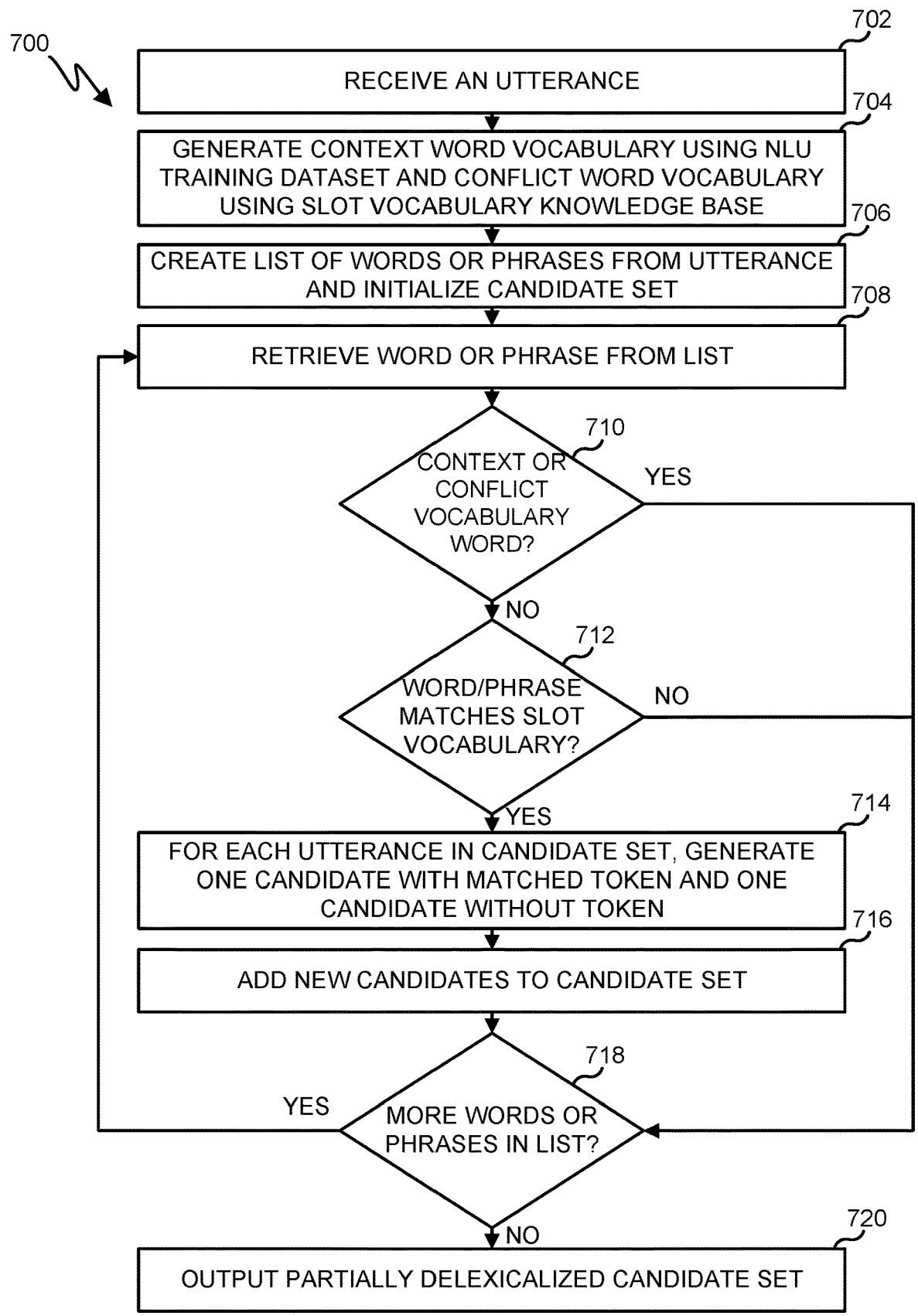
FIG. 7 illustrates an example delexicalization seeding process in accordance with various embodiments of this disclosure.

FIG. 7 illustrates an example delexicalization seeding process 700 in accordance with various embodiments of this disclosure. For ease of explanation, the process 700 may be described as being executed or otherwise used by the processor(s) 120 of any of the electronic devices 101, 102, 104 or the server 106 in FIG. 1. The delexicalization seeding process 700 can also be part of the process 600, such as part of the seed delexicalized candidates module 606, and can also be used as part of the NLU inference service 206 and/or the hybrid NLU model 208 of the system 200. However, the process 700 may be used by any suitable device(s) and in any suitable system.

At block 702, the processor receives an utterance or query q. The utterance can be an utterance, such as a question or a command from a user, that is converted from original voice data to text so that the utterance can be at least partially delexicalized and parsed by an NLU model, such as the NLU model 208 or 308. At block 704, the processor generates a context word vocabulary $V_{context}$ using the utterance and an NLU training dataset T, such as the original NLU training dataset 306 or the combined dataset 304. The context word vocabulary $V_{context}$ is a set of words or phrases that are known to not be used as parameters, such as connective words like "the," "and," "with," or other words. Also at block 704, the processor generates a conflict word vocabulary $V_{conflict}$ using the utterance q and a slot vocabulary $V_s$, such as the slot vocabulary 210, 310, or 610. The conflict word vocabulary $V_{conflict}$ includes words or phrases that may belong to multiple slots. For example, the phrase "Clint Eastwood" can be both an @actor slot and a @director slot in different contexts. At block 704, the processor creates the context word vocabulary $V_{context}$ from any words or phrases in the utterance that are not to be slot filled or essentially ignored and creates the conflict word vocabulary $V_{conflict}$ from any words or phrases in the utterance that are known from the slot vocabulary $V_s$ to belong to multiple slots in different contexts. Since the context is not necessarily known at this stage in the process 700, creating the conflict word vocabulary $V_{conflict}$ prevents adding a potentially incorrect or conflicting token to the utterance before parsing the utterance.

At block 706, the processor creates a list of words or phrases L from the utterance q and initializes a candidate set C to empty. In some embodiments, the list of words or phrases L can be ordered from longest phrase to shortest phrase, as one example. The initialized candidate set C is used to store candidates to be parsed by the NLU model, where the candidates are versions of the utterance with or without tokens replacing words or phrases. At block 708, the processor retrieves a word or phrase p from the list L, such as the next word in the list starting from the longest phrase. At decision block 710, the processor determines if the retrieved word or phrase p matches any words or phrases in the context vocabulary $V_{context}$ or the conflict vocabulary $V_{conflict}$. If so, the process 700 moves to decision block 718. At decision block 718, the processor determines if there are more words or phrases p in the list L that have not yet been retrieved. If so, the process 700 loops back to block 708 to retrieve the next word or phrase p from the list L.

If the processor determines that the retrieved word or phrase p is not in the context vocabulary $V_{context}$ or the conflict vocabulary $V_{conflict}$ at decision block 710, the process 700 moves to decision block 712. At decision block 712, the processor determines if the retrieved word or phrase p matches a word or phrase in the slot vocabulary $V_s$. If not, the process 700 moves to decision block 718 to determine if there are yet more words or phrases in the list L and, if so, retrieves the next word or phrase in the list L at block 708. If the processor determines that the retrieved word or phrase p from the list L matches a word or phrase in the slot vocabulary $V_s$ at decision block 712, the process 700 moves to block 714. At block 714, for each candidate currently in candidate set C, the processor generates two new candidates, one candidate with the matched word or phrase in the utterance replaced with a token from the slot vocabulary $V_s$ that corresponds to the matched word or phrase and another candidate without replacing the word or phrase. At block 716, the processor adds the newly-created candidates to the candidate set C. In this way, new variations from each candidate already created and added to the candidate set C are included, such as candidates that have multiple replaced words or phrases.

As a particular example of this, suppose for an utterance of "post message to Bob happy new year," the processor retrieves the word "Bob," replaces "Bob" with a <contact> token, and adds the new candidate "post message to <contact> happy new year" to the candidate set C. Also, suppose the processor retrieves the phrase "new year" from the candidate and determines, just as an illustration, that the phrase "new year" is in the slot vocabulary $V_s$ corresponding to a <message> token. Since both the original utterance of "post message to Bob happy new year" and the utterance of "post message to <contact> happy new year" exist as candidates in the candidate set C, the processor adds both a new candidate of "post message to Bob happy <message>" and a new candidate of "post message to <contact> happy <message>." Generating candidates for the candidate set C in this manner provides for multiple variations on the utterance, including different combinations of tokens, so that each variation can be parsed by the NLU model or parser P to score each variation and determine which variation provides the results with the highest confidence.

The process 700 moves to decision block 718 to determine if there are yet more words or phrases in the list L and, if so, retrieves the next word or phrase in the list L at block 708. In this way, the process 700 determines if there is a match in the slot vocabulary $V_s$ for each word or phrase in the utterance and populates the candidate set C with both the original utterance and variations of the utterances including one or more words or phrases replaced with tokens. It will be understood that, depending on the utterance, no matches may be found and only the original utterance is added to the candidate set C. If the processor determines that there are no more words or phrases p in the list L at decision block 718, at block 720, the processor outputs the populated partially delexicalized candidate set C.

Although FIG. 7 illustrates one example of a delexicalization seeding process 700, various changes may be made to FIG. 7. For example, while shown as a series of steps, various steps in FIG. 7 can overlap, occur in parallel, occur in a different order, or occur any number of times. As a particular example, decision block 712 can occur before decision block 710 such that a word or phrase that may be determined to be in the vocabulary $V_s$ is also a conflict or context word or phrase, resulting in the matched word or phrase not being replaced.

Figure 8:
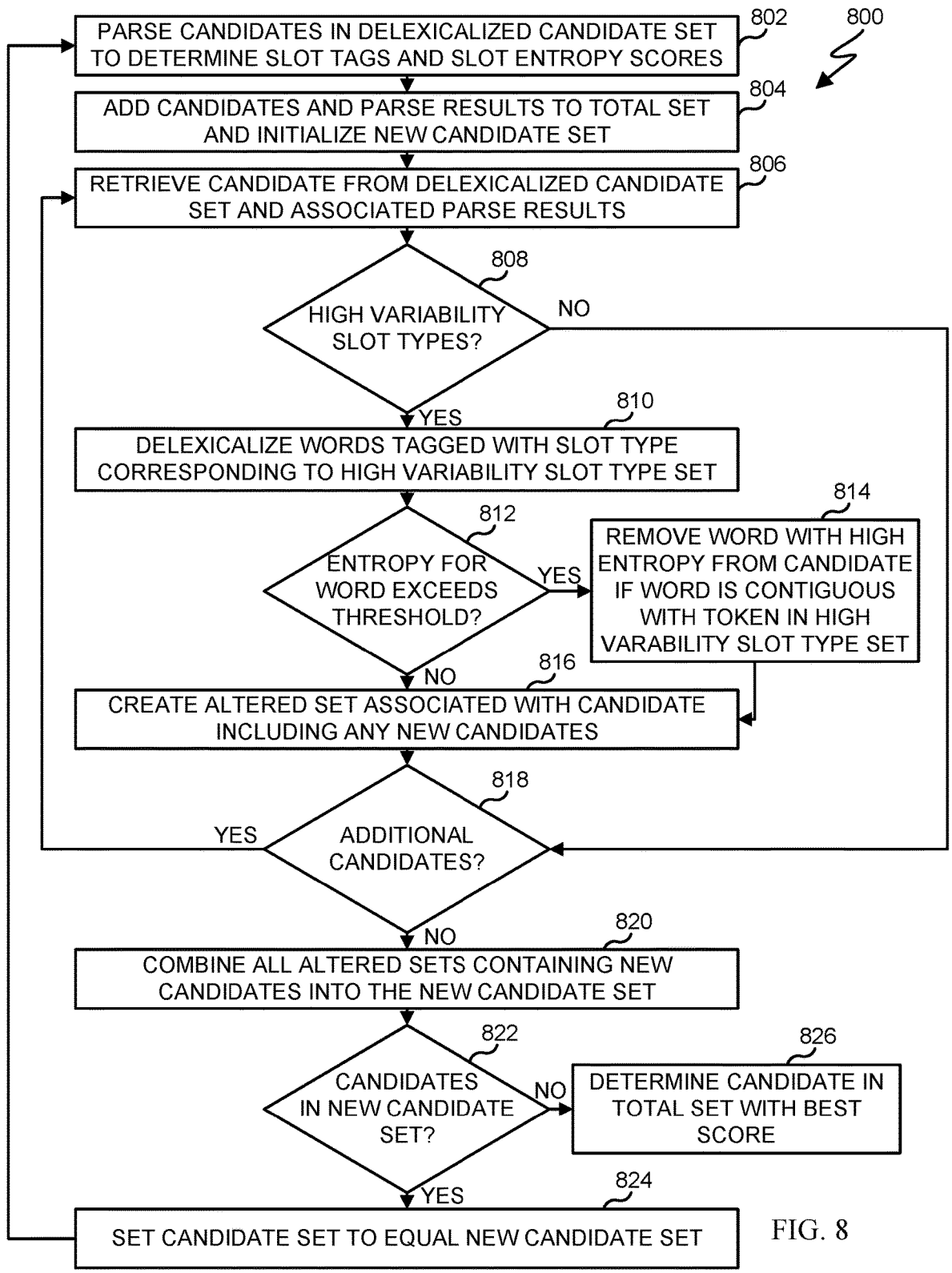
FIG. 8 illustrates an example candidate generation by delexicalization and scoring process in accordance with various embodiments of this disclosure.

FIG. 8 illustrates an example candidate generation by delexicalization and scoring process 800 in accordance with various embodiments of this disclosure. For ease of explanation, the process 800 may be described as being executed or otherwise used by the processor(s) 120 of any of the electronic devices 101, 102, 104 or the server 106 in FIG. 1. The candidate generation by delexicalization process 800 can also be part of the process 600, such as part of the candidate generation by delexicalization module 612, and can also be used as part of the NLU inference service 206 and/or the hybrid NLU model 208 of the system 200. However, the process 800 may be used by any suitable device(s) and in any suitable system.

At block 802, the processor using the NLU model or parser p parses each candidate u in the candidate set C, such as those created in the process 700, and determines parse results for each candidate u including slot tags and slot entropy scores. Slot entropy scores are scores for each slot-filled word or phrase that rate the confidence of the NLU model in the parse result for that particular word or phrase. At block 804, the parsed candidates and the associated parse results are added to a total parsed candidate set $C_{total}$ such that $C_{total}=C_{total}\cup C$. The total parsed candidate set $C_{total}$ stores all parsed candidates for use in determining which parsed candidate provides the highest confidence score. At block 804, the processor also initializes a new candidate set $C_{new}$. In some embodiments, before the parsed candidates in the total parsed candidate set $C_{total}$ are analyzed for the highest scoring candidate, the parsed candidates can be further delexicalized to provide even more parsed candidates and potentially to discover a new candidate with an even higher score than previously parsed candidates. The candidate generation by delexicalization process 800 provides these new candidates by further delexicalizing the candidates parsed at block 802 based on domain-independent delexicalization rules.

At block 806, the processor retrieves a parsed candidate u from the candidate set including the associated parse results, such as slot types and slot entropy scores. At decision block 808, the processor analyzes slot types of the retrieved candidate that were assigned to words or phrases during parsing of the candidate at block 802. At decision block 808, the processor also determines if any slot types in the candidate match a slot type included in a high variability slot type set S. A high variability slot type is a slot type that can be assigned to content having a high variability, such as a message that can be composed of anything a user wishes to say. For example, if the retrieved parsed candidate u includes a word or phrase that is tagged with a slot type of @message, the processor may determine that this slot type is included in the high variability slot type set S. If the processor determines that the candidate u includes a slot type that is a high variability slot type at decision block 808, the process 800 moves to block 810. At block 810, the processor delexicalizes one or more words or phrases in the candidate u by replacing the one or more words or phrases tagged with a high variability slot type with a token corresponding to the slot type, such as with a <message> token. The process 800 then moves to decision block 812. If the processor determines that the utterance does not include any high variability slot types at decision block 808, the process moves to decision block 818.

At decision block 812, the processor determines if a slot entropy score for one or more of the slot-filled words or phrases exceeds an uncertainty threshold t. For example, if the word "happy" in the utterance "post message to Bob happy <message>" has a slot entropy score of 0.2 and the uncertainty threshold t is 0.1 (indicating that a score higher than 0.1 involves a high uncertainty), the processor can determine at decision block 812 that the score for the word "happy" exceeds the threshold. If so, at block 814, the processor removes one or more words or phrases determined to have an entropy score that exceeds the threshold from the candidate if the word or phrase having the high entropy score is contiguous with a token in the candidate (that is, to the left, right, or adjacent to the token). For instance, for the candidate "post message to Bob happy <message>," the word "happy" can be removed or merged into the token to produce a new candidate of "post message to Bob <message>." The process 800 then moves to block 816. If the processor determines that the candidate does not include words or phrases with entropy scores that exceed a threshold or if there are no words or phrases with high entropy scores that are contiguous with a token corresponding to a slot in the high variability slot type set at decision block 812, the process 800 moves to block 816.

At block 816, the processor creates an altered candidate set $C_u$ associated with the candidate retrieved at block 806 that includes any new candidates created in block 812 and/or block 814. In some embodiments, the processor at blocks 812 and 814 may alter a candidate using both methods to add tokens for high variability slots and remove contiguous words or phrases with high entropy scores. Also, in some embodiments, the processor may perform one of block 812 or block 814 or may perform each of blocks 812 and 814 separately on the retrieved candidate to create two new candidates. At decision block 818, the processor determines if there are additional parsed candidates from the candidate set C and, if so, loops back to block 806 to retrieve another candidate for further candidate generation by delexicalization. If the processor determines that there are no additional candidates at decision block 818, the process 800 moves to block 820. At block 820, the processor combines each altered candidate set $C_u$ created from each candidate in candidate set C into the new candidate set $C_{new}$ initialized at block 804 such that $C_{new} = \cup_{u \in c} C_u$. Here, $C_{new}$ includes every new delexicalized candidate created during the process 800 from each parsed candidate from candidate set C.

At decision block 822, the processor determines if the new candidate set $C_{new}$ includes at least one new candidate such that $|C_{new}| > 0$. If the new candidate set $C_{new}$ has at least one new candidate, at block 824, the processor overwrites the candidate set C to include the new candidates from $C_{new}$ such that $C = C_{new}$. Since the candidates in the candidate set C were previously added to the total set $C_{total}$ at block 804, the parse results for the previous candidates of candidate set C are retained in the total set $C_{total}$. The process 800 loops to block 802 to parse the new candidates in the candidate set C and store the parsed new candidates in the total set $C_{total}$ at block 804 while also reinitializing the new candidate set $C_{new}$ and to generate further new candidates if appropriate at blocks 806-820.

If the processor determines that the new candidate set $C_{new}$ does not include any candidates at decision block 822, the process moves to block 826. For example, if neither the determinations at decision blocks 808 and 812 were true for each candidate in the candidate set C, the new candidate set $C_{new}$ would contain no new candidates, and the process 800 would move to block 826. At block 826, the processor determines the best candidate $u_{best}$ in the total set $C_{total}$, such as the candidate that has the highest parsing confidence score. In some embodiments, the parsing confidence score for each candidate is determined from the slot entropy scores for the candidate. For example, the parsing confidence score can be calculated as the inverse of the average slot entropy score for a candidate, which would be defined as Score=n/$\Sigma i E i$. Once the processor selects the best candidate, the processor can use the selected candidate to post-process the inferred slots and output the intent and slot tags to fulfill the original user query, such as shown in FIG. 6.

Although FIG. 8 illustrates one example of a candidate generation by delexicalization and scoring process 800, various changes may be made to FIG. 8. For example, while shown as a series of steps, various steps in FIG. 8 can overlap, occur in parallel, occur in a different order, or occur any number of times. As a particular example, after block 810, the process may move to block 816 without moving to decision block 812 so as to only perform one of blocks 810 and 814 for a particular candidate. In these embodiments, a new candidate generated by blocks 810 and 814 can be added to the new candidate set and, after another round of parsing, can be possibly processed by one of blocks 810 and 814. Also, at block 810, the processor may only delexicalize one word or phrase, even if multiple high variability slot words or phrases are found, and can perform block 810 on the new candidate after another round of parsing.

Figure 9:
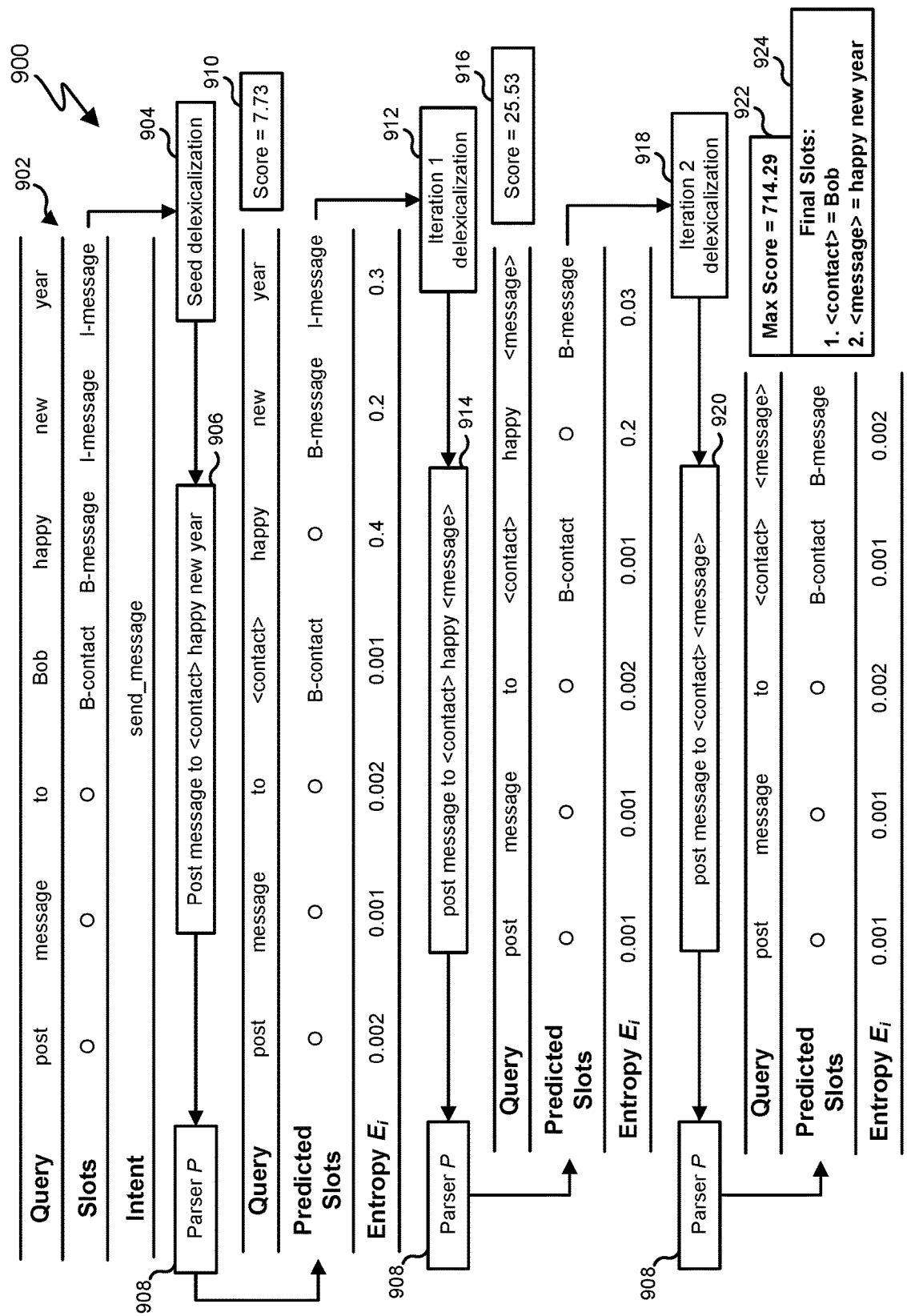
FIG. 9 illustrates an example iteratively delexicalized utterance in accordance with various embodiments of this disclosure.

FIG. 9 illustrates an example iteratively delexicalized utterance 900 in accordance with various embodiments of this disclosure. The example utterance 900 includes an original utterance 902 that may be possibly received from a user that includes a first utterance of "post message to Bob happy birthday." The ground truths for the first utterance 902 are shown for reference in FIG. 9, but a parser 908 would not yet have determined any slots for the utterance 902. At block 904, the utterance 902 is seeded with tokens such as described with respect to blocks 604 and 606 in FIG. 6 and as described with respect to the process 700 of FIG. 7. In this example, after seeding the utterance 902 with a token, a first candidate 906 is created that includes "post message to <contact> happy new year," where Bob has been replaced with the token <contact>.

The first candidate 906 is parsed by the parser 908, which provides a series of predicted slots for the first candidate 906 and slot entropy scores $E_i$ for each predicted slot. For example, the slot entropy score for each of the words in the phrase "post message to <contact>" are very low, indicating a high confidence that these words have been parsed accurately. However, the entropy scores for the words in the phrase "happy new year" are respectively 0.4, 0.2, and 0.3 in this example and thus indicate a low confidence. Additionally, as illustrated in FIG. 9, the word "happy" has not been recognized according to its ground truth slot type, while "new" and "year" have been tagged with "B-message" and "I-message" slot types, respectively. A first score 910 for the first candidate 906, taken from the inverse of the average of all the slot entropy scores, is approximately 7.73.

The first candidate 906 is passed through a first iteration 912 of a candidate generation by delexicalization process, such as that described with respect to block 612 of FIG. 6 and as described with respect to the process 800 of FIG. 8. In the first iteration 912, the processor determines that the words "new" and "year" tagged with "B-message" and "I-message," respectively, have slot types that correspond to a high variability slot type, a @message slot type. The first iteration 912 therefore results in the replacement of the phrase "new year" with a <message> token in a second candidate 914. The second candidate 914 thus includes the utterance "post message to <contact> happy <message>."

The new second candidate 914 is processed by the parser 908 to provide predicted slots and associated slot entropy scores for the second candidate 914. As shown in FIG. 9, the slot entropy for the token <message> that replaced "new year" has been reduced to a slot entropy score of 0.03, while the slot entropy score for "happy" remains higher. A second score 916 for the second candidate 914 is 25.53. The second candidate 914, along with its predicted slots and slot entropy scores, is passed through a second iteration 918 of a candidate generation by delexicalization process. The second iteration 918 produces a third candidate 920 including the utterance "post message to <contact> <message>." For example, as described with respect to the process 800, contiguous words or phrases in a candidate can be removed or merged with a token corresponding to a high variability slot that is already included in a candidate. In the example illustrated in FIG. 9, the word "happy" is contiguous with the token <message> in the second candidate 914 and is removed or merged into the token <message> in the third candidate 920.

The third candidate 920 is processed by the parser 908 to determine predicted slots and entropy scores for the third candidate 920. As shown in FIG. 9, the entropy scores for the third candidate 920 are all very low scores, indicating a high confidence. A third score 922 for the third candidate is 714.29, much higher than the previous scores for the first and second candidates 906 and 914. In this example, the third candidate 920 is chosen based on the high third score 922 and, at block 924, the third candidate 920 is processed to remove the special tokens for the words "Bob" and "happy new year" so that the third candidate 920 can be used to fulfill the associated task for the query.

Although FIG. 9 illustrates one example of an iteratively delexicalized utterance 900, various changes may be made to FIG. 9. For example, it will be understood that FIG. 9 provides just one example of how a query can be iteratively delexicalized to provide candidates with high confidence scores. Other queries can be used, and the number of iterations can be different depending on the query.

Figure 10:
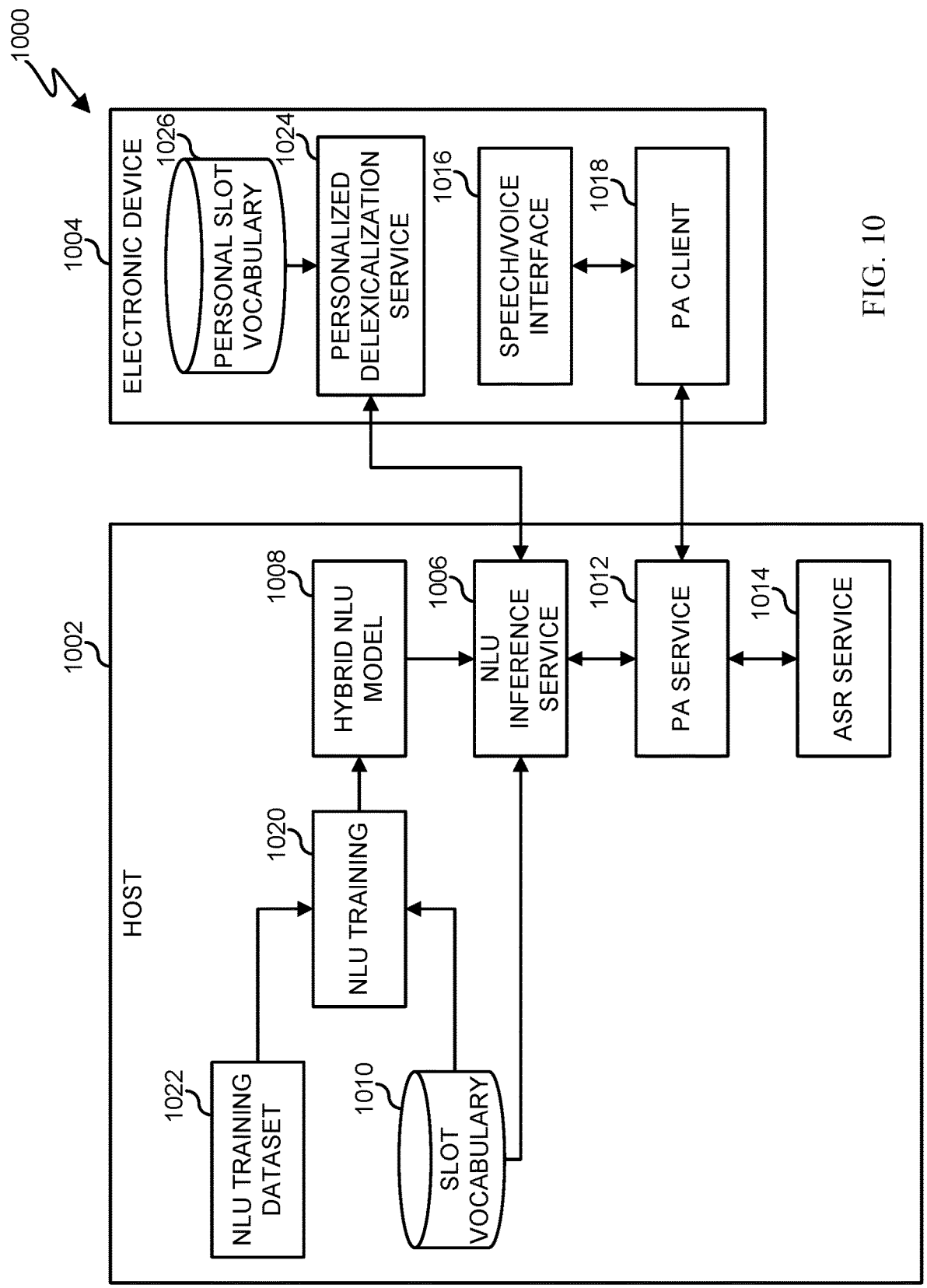
FIG. 10 illustrates an example personalized NLU system in accordance with various embodiments of this disclosure.

FIG. 10 illustrates an example personalized NLU system 1000 in accordance with various embodiments of this disclosure. The system 1000 includes at least one host device 1002 and at least one electronic device 1004. In some embodiments, the host device 1002 can be the server 106, and the electronic device 1004 can be the electronic device 101. The host device 1002 includes an NLU inference service 1006 that utilizes a hybrid NLU model 1008 and a slot vocabulary 1010 to process queries received by a PA service 1012 executed by the host device 1002. The hybrid NLU model 1008 is provided from NLU training 1020 that utilizes the slot vocabulary 1010 and an NLU training dataset 1022 as described in the various embodiments of this disclosure. The PA service 1012 cooperates with an ASR service 1014 to receive queries or utterances from the electronic device 1004. The electronic device 1004 includes a speech/voice interface 1016 configured to receive queries or utterances from a user of the electronic device 1004. A PA client 1018 receives the queries or utterances from the speech/voice interface 1016 and transmits the queries or utterances from the electronic device 1004 to the PA service 1012 at the host device 1002.

The NLU inference service 1006 and the hybrid NLU model 1008 can delexicalize queries received from the electronic device 1004 and iteratively delexicalize candidates to determine a best candidate for use in fulfilling query actions for the electronic device 1004 as described in the various embodiments of this disclosure. In the system 1000, the electronic device 1004 further includes a personalized delexicalization service 1024 that utilizes a personal slot vocabulary 1026 to further delexicalize utterances based on data stored or accessed by the electronic device 1004. For example, the personal slot vocabulary 1026 can utilize information on or accessed by the electronic device 1004, such as a contact list, music library, emails (such as emails including travel itineraries), or other information, that can further inform the delexicalization of utterances. In some embodiments, the personalized delexicalization service 1024 and the personal slot vocabulary 1026 can operate on the electronic device 1004 without any centralized slot vocabulary on the server. In such a case, the NLU system on the host device 1002 can operate without any further developer input to construct or maintain a slot vocabulary on the host device 1002.

During the inference phase, in the seed delexicalization process such as that described with respect to FIG. 7 and blocks 604 and 606 of FIG. 6, the personalized delexicalization service 1024 can generate additional delexicalized candidates. These candidates are delexicalized based on the user's personal slot vocabulary 1026. For example, if an utterance includes "send message to Alice wishing happy birthday" and the word "Alice" is not included in the slot vocabulary 1010 of the host device 1002, the personalized delexicalization service 1024 can determine if "Alice" is in the personal slot vocabulary 1026, such as by determining whether "Alice" is in a user's contact list stored on or accessed by the electronic device 1004. If so, the utterance can be delexicalized to replace "Alice" with a <contact> token. As another example, for an utterance of "play song by Madonna," the personalized delexicalization service 1024 can determine if "Madonna" is in the personal slot vocabulary 1026, such as by determining whether "Madonna" is in a user's music library stored on or accessed by the electronic device 1004. If so, the utterance can be delexicalized to replace "Madonna" with an (artist) token. In the various embodiments of this disclosure, the personalized delexicalization service 1024 does not require any additional retraining of the NLU model.

Although FIG. 10 illustrates one example of a personalized NLU system 1000, various changes may be made to FIG. 10. For example, in some embodiments, the PA service 1012, the ASR service 1014, the NLU inference service 1006, and the hybrid NLU model 1008 can be performed on different devices, such as part of a distributed networked computing environment. Additionally, the training of the NLU model 1008 can be performed by a different device other than the device on which the NLU model 1008 is implemented, such as to assist the NLU inference service 1006 in fulfilling queries or commands received via the PA service 1012. In addition, the personal slot vocabulary 1026 can be stored on a different device such as the host device 1002, and the electronic device 1004 can receive and send data involving the personal slot vocabulary 1026 via the personalized delexicalization service 1024.

Figure 11:
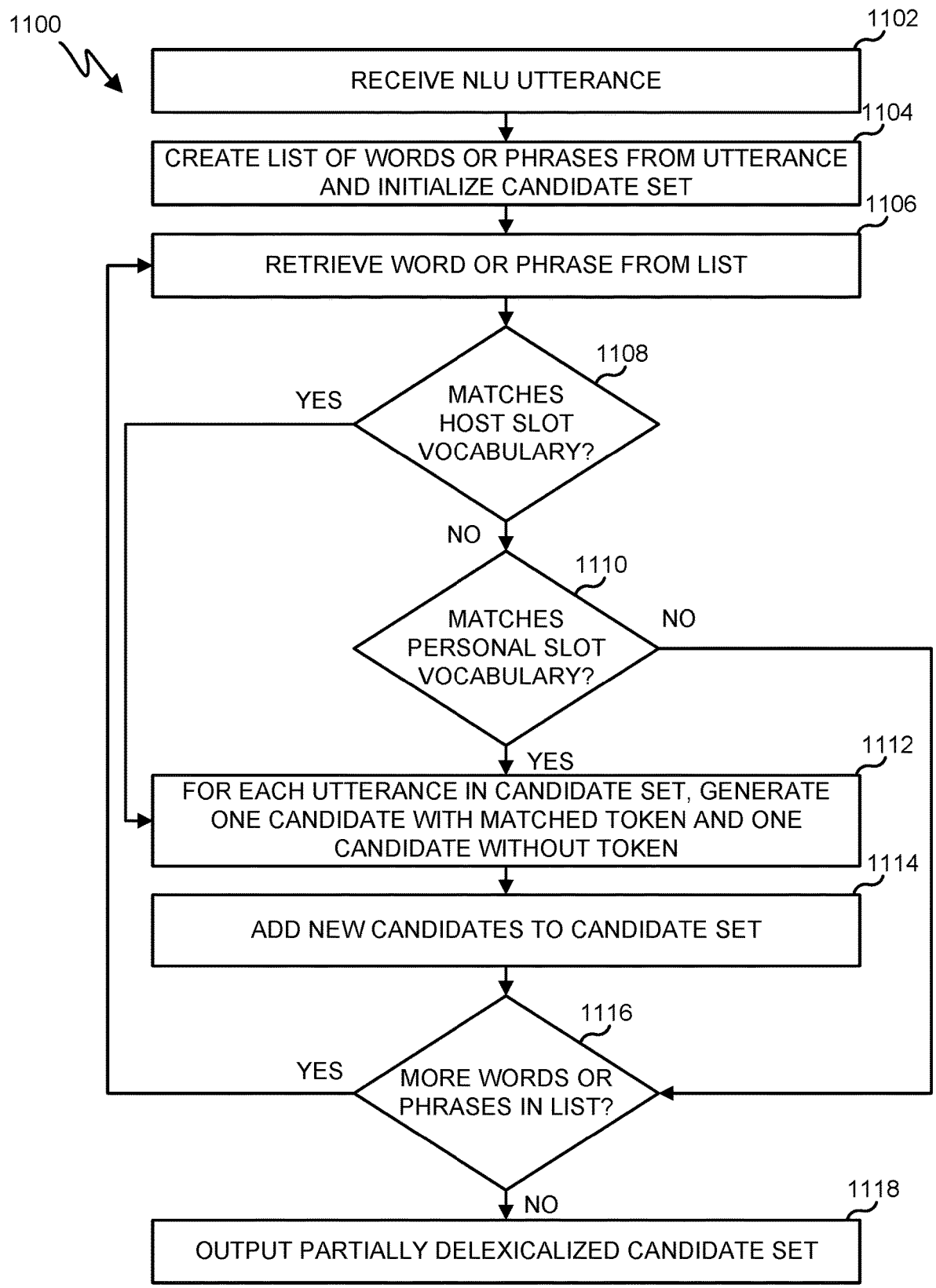
FIG. 11 illustrates an example personalized NLU process in accordance with various embodiments of this disclosure.

FIG. 11 illustrates an example personalized NLU process 1100 in accordance with various embodiments of this disclosure. For ease of explanation, the process 1100 may be described as being executed or otherwise used by the processor(s) 120 of any of the electronic devices 101, 102, 104 or the server 106 in FIG. 1. The process 1100 can also be part of a personalized delexicalization service, such as in the system 1000. However, the process 1100 may be used by any suitable device(s) and in any suitable system.

At block 1102, the processor receives an utterance or query. The utterance can be an utterance, such as a question or a command from a user, that is converted from original voice data to text so that the utterance can be at least partially delexicalized and parsed by an NLU model. At block 1104, the processor creates a list of words or phrases from the utterance and initializes a candidate set to empty. In some embodiments, the list of words of phrases can be ordered from longest word to shortest word, as one example. The initialized candidate set is used to store candidates to be parsed by the NLU model, where the candidates are versions of the utterance with or without tokens replacing words or phrases. At block 1106, the processor retrieves a word or phrase from the list, such as the next word in the list starting from the longest word. At decision block 1108, the processor determines if the retrieved word or phrase matches a word or phrase in a slot vocabulary, such as the slot vocabulary 1010.

If the retrieved word or phrase matches a word or phrase in the slot vocabulary, the process 1100 moves to block 1112. At block 1112, for each candidate currently in the candidate set, the processor generates two new candidates, one candidate with the matched word or phrase in the utterance replaced with a token from the slot vocabulary that corresponds to the matched word or phrase and another candidate without replacing the word or phrase. At block 1114, the processor adds the newly-created candidates to the candidate set. In this way, variations from each candidate already created and added to the candidate set are included, such as candidates that have multiple replaced words or phrases. If the processor determines that the retrieved word or phrase does not match a word or phrase in the slot vocabulary at decision block 1108, the process 1100 moves to decision block 1110. At decision block 1110, the processor determines if the retrieved word or phrase matches a word or phrase in the personal slot vocabulary, such as the personal slot vocabulary 1026. In some embodiments, an NLU inference service, such as the NLU inference service 1006, communicates with a personalized delexicalization service, such as the personalized delexicalization service 1024, to request any tokens from the personalized delexicalization service based on the retrieved word or phrase.

If the retrieved word or phrase does not match a word or phrase in the personal slot vocabulary, the process moves to decision block 1116. If the retrieved word or phrase matches a word or phrase in the personal slot vocabulary, the process 1100 moves to block 1112. At block 1112, for each candidate currently in candidate set, the processor generates two new candidates, one candidate with the matched word or phrase in the utterance replaced with a token from the personal slot vocabulary that corresponds to the matched word or phrase and another candidate without replacing the word or phrase. In some embodiments, two new candidates can be created from each candidate in the candidate set. At block 1114, the processor adds the newly-created candidates to the candidate set. At decision block 1116, the processor determines if there are more words or phrases in the list and, if so, retrieves the next word or phrase in the list at block 1106. If the processor determines that there are no more words or phrases in the list at decision block 1116, at block 1118, the processor outputs the populated partially delexicalized candidate set.

Although FIG. 11 illustrates one example of a personalized NLU process 1100, various changes may be made to FIG. 11. For example, while shown as a series of steps, various steps in FIG. 11 can overlap, occur in parallel, occur in a different order, or occur any number of times. As a particular example, the processor can also determine if the word or phrase retrieved at block 1106 matches any words or phrases in the context vocabulary or the conflict vocabulary to before attempting to replace the word or phrase, such as described with respect to FIG. 7.

Figure 12:
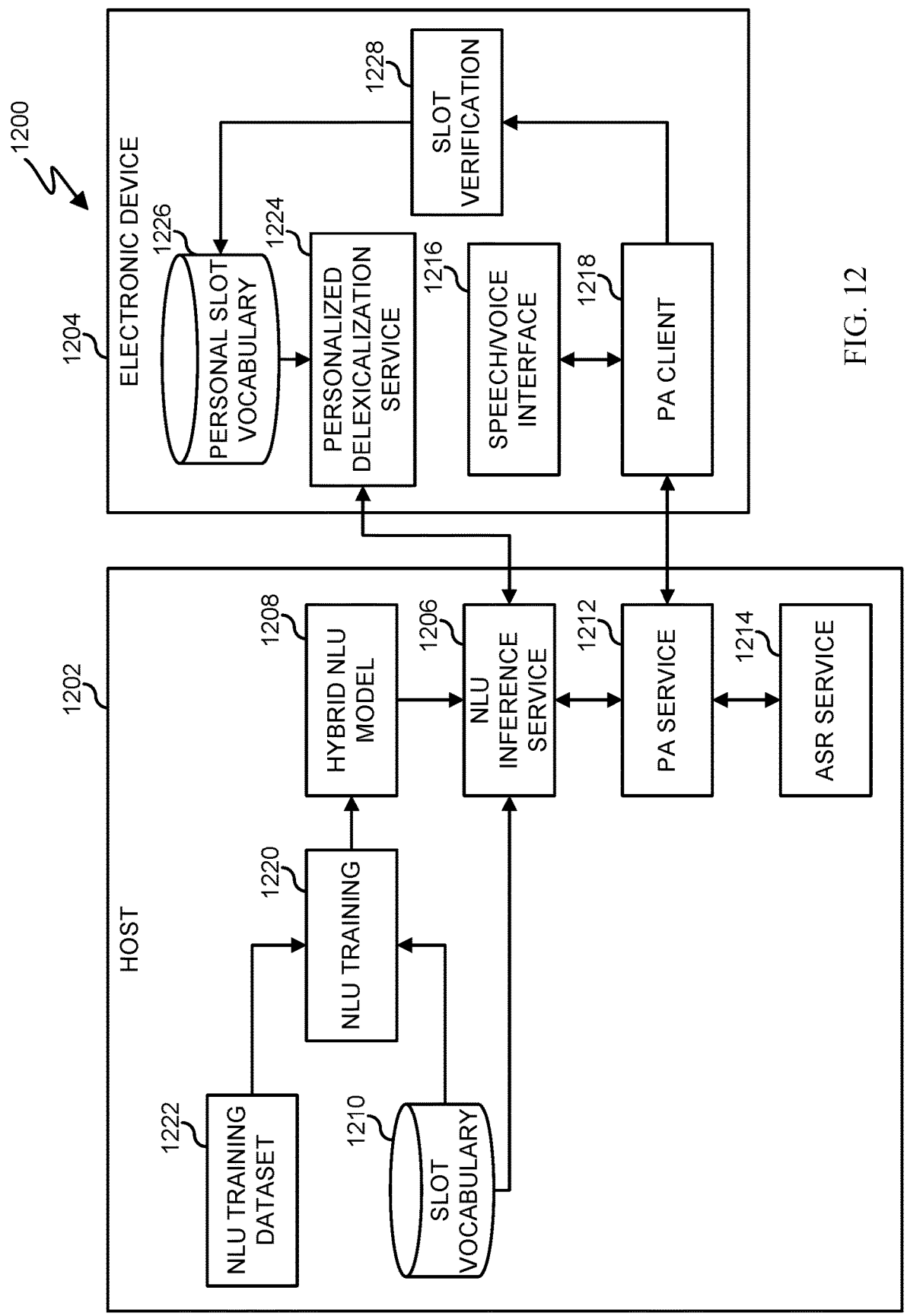
FIG. 12 illustrates an example continuous personalized NLU system in accordance with various embodiments of this disclosure.

FIG. 12 illustrates an example continuous personalized NLU system 1200 in accordance with various embodiments of this disclosure. The system 1200 includes at least one host device 1202 and at least one electronic device 1204. In some embodiments, the host device 1202 can be the server 106, and the electronic device 1204 can be the electronic device 101. The host device 1202 includes an NLU inference service 1206 that utilizes a hybrid NLU model 1208 and a slot vocabulary 1210 to process queries received by a PA service 1212 executed by the host device 1202. The hybrid NLU model 1208 is provided from NLU training 1220 that utilizes the slot vocabulary 1210 and an NLU training dataset 1222 as described in the various embodiments of this disclosure. The PA service 1212 cooperates with an ASR service 1214 to receive queries or utterances from the electronic device 1204. The electronic device 1204 includes a speech/voice interface 1216 configured to receive queries or utterances from a user of the electronic device 1204. A PA client 1218 receives the queries or utterances from the speech/voice interface 1216 and transmits the queries or utterances from the electronic device 1204 to the PA service 1212 at the host device 1202.

The NLU inference service 1206 and the hybrid NLU model 1208 can delexicalize queries received from the electronic device 1204 and iteratively delexicalize candidates to determine a best candidate for use in fulfilling query actions for the electronic device 1204 as described in the various embodiments of this disclosure. In the system 1200, the electronic device 1204 further includes a personalized delexicalization service 1224 that utilizes a personal slot vocabulary 1226 to further delexicalize utterances based on data stored or accessed by the electronic device 1204 as described with respect to FIGS. 10 and 11.

The system 1200 also includes a slot verification service 1228 executed by the electronic device 1204. The slot verification service 1228 receives from the PA client 1218 the results from the output of the NLU inference service 1206, such as an intent and slot (key, value) pairs. The slot verification service 1228 can verify whether or not each slot pair is correct. The slot verification service 1228 can be automated, such as being based on confidence scores. The slot verification service 1228 can also request verification from a user, crowd source workers, or other parties, such as in a message prompt, or can verify each slot pair based on an inference, such as inferring that the slot pairs are correct if a user chooses to send a message generated by the NLU inference service 1206 and the PA service 1212. If a verified slot value is not in the slot vocabulary 1210 or the personal slot vocabulary 1226, the slot value can be added to the slot vocabulary 1210 or the personal slot vocabulary 1226 and associated with a token. In some embodiments, the slot vocabulary 1210 (or the slot vocabulary 210, 310, 610, or 1010) can also be updated over time by developers to maintain contemporary slot values, such as the latest movie or show names.

Although FIG. 12 illustrates one example of a continuous personalized NLU system 1200, various changes may be made to FIG. 12. For example, in some embodiments, the PA service 1212, the ASR service 1214, the NLU inference service 1206, and the hybrid NLU model 1208 can be performed on different devices, such as part of a distributed networked computing environment. Additionally, the training of the NLU model 1208 can be performed by a different device other than the device on which the NLU model 1208 is implemented, such as to assist the NLU inference service 1206 in fulfilling queries or commands received via the PA service 1212. Further, the personal slot vocabulary 1226 can be stored on a different device such as the host device 1202, and the electronic device 1204 can receive and send data involving the personal slot vocabulary 1226 via the personalized delexicalization service 1224. In addition, the slot verification service 1228 can be executed by another device, such as the host device 1202.

Figure 13:
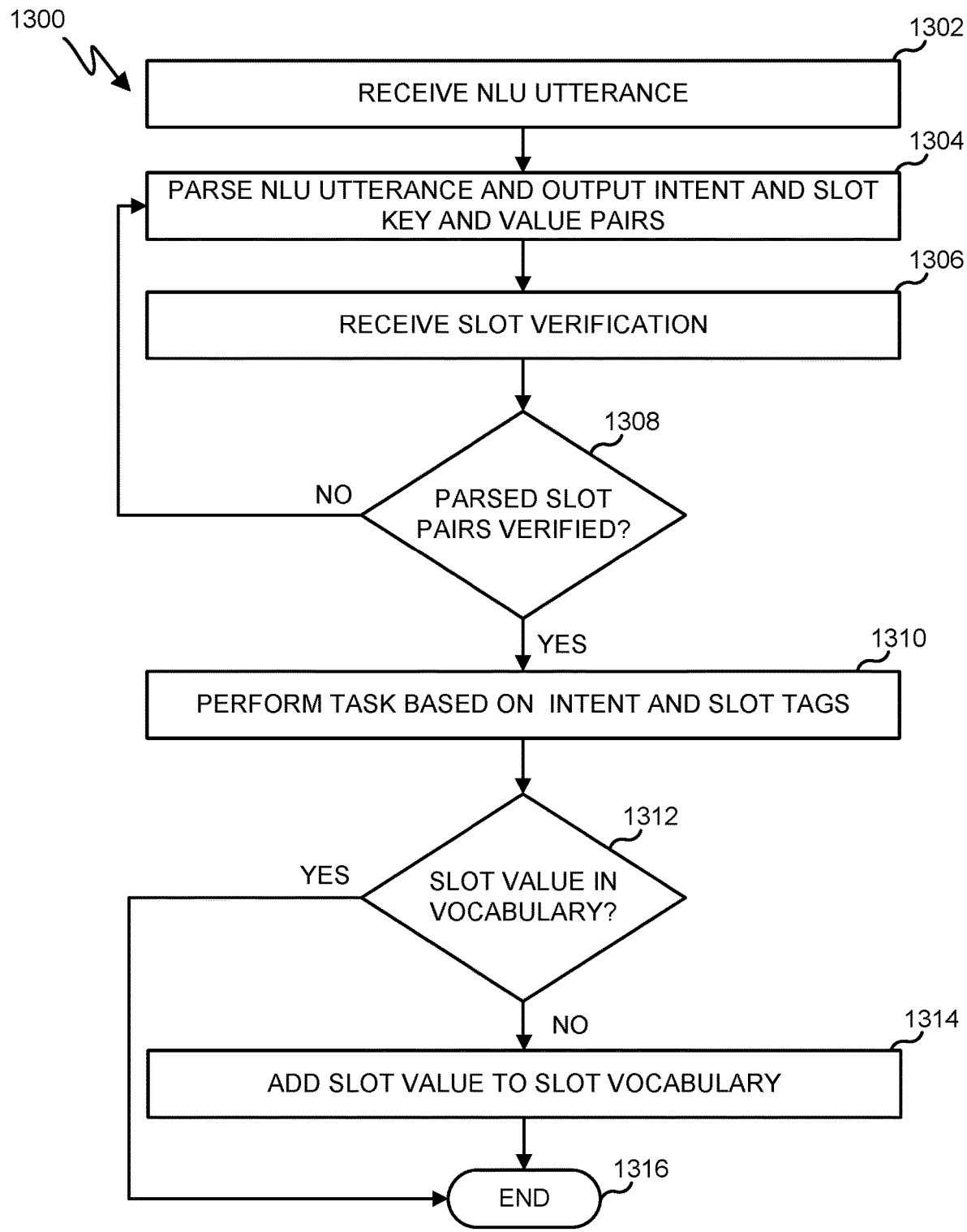
FIG. 13 illustrates an example continuous learning and personalization process in accordance with various embodiments of this disclosure.

FIG. 13 illustrates an example continuous learning and personalization process 1300 in accordance with various embodiments of this disclosure. For ease of explanation, the process 1300 may be described as being executed or otherwise used by the processor(s) 120 of any of the electronic devices 101, 102, 104 or the server 106 in FIG. 1. However, the process 1300 may be used by any suitable device(s) and in any suitable system.

At block 1302, the processor receives an utterance. At block 1304, the processor parses the utterance and outputs an intent and slot key and value pairs for the utterance. At block 1306, the processor receives a slot verification, such as from a slot verification service (like the slot verification service 1228). The slot verification verifies whether or not each slot pair is correct. The slot verification can be automated, such as using the various approaches described above. At decision block 1308, the processor determines if the slot pairs are verified. If not, the process 1300 moves back to block 1304 to re-parse the utterance. If the processor determines that the slot pairs are verified at decision block 1308, the process 1300 moves to block 1310. At block 1310, the processor performs a task based on the intent and slot tags for the utterance.

At decision block 1312, the processor determines if the verified slot value is in a slot vocabulary, such as either the slot vocabulary 1210 or the personal slot vocabulary 1226. If a verified slot value is not in the slot vocabulary or the personal slot vocabulary, at block 1314, the slot value can be added to the slot vocabulary or the personal slot vocabulary and associated with a token. The process 1300 ends at block 1316. If the processor determines that the slot value is in the slot vocabulary or the personal slot vocabulary at decision block 1312, the process ends at block 1316.

Although FIG. 13 illustrates one example of a continuous learning and personalization process 1300, various changes may be made to FIG. 13. For example, while shown as a series of steps, various steps in FIG. 13 can overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method, comprising:
processing an utterance using a trained machine learning model;
partially delexicalizing the utterance using the trained machine learning model by replacing a first portion of the utterance with a first token from a slot vocabulary, wherein the first token represents a semantic role of the first portion of the utterance, and wherein the slot vocabulary includes a plurality of words or phrases each associated with one or more tokens included in the slot vocabulary;
determining, using the trained machine learning model, a slot value in the processed utterance based on the first token in the partially delexicalized utterance;
delexicalizing, in at least one candidate of one or more candidates that include the processed utterance, at least one word tagged with a slot type corresponding to a high variability slot type;
removing the at least one word from the at least one candidate based on a determination that a slot entropy score for the at least one candidate is above a threshold to create an altered candidate set;
determining, based on a calculated inverse of an average of one or more slot entropy scores, a parsing confidence score for each of the one or more candidates including the processed utterance;
selecting the processed utterance from among the one or more candidates based on the parsing confidence score for the processed utterance; and
performing a task corresponding to the utterance based on the determined slot value and the selected processed utterance.

2. The method of claim 1, wherein:
the trained machine learning model is trained using training data including tokens and non-tokens for learning one or more semantic relationships between the tokens and the non-tokens; and
the slot vocabulary includes data different from the training data and is domain-dependent.

3. The method of claim 1, further comprising:
replacing at least a second portion of the utterance with a second token prior to processing the utterance using the trained machine learning model.

4. The method of claim 3, further comprising:
determining the second token based on string-matching of the second portion of the utterance and a content in the slot vocabulary.

5. The method of claim 1, wherein replacing the first portion of the utterance with the first token includes:
identifying that a slot associated with the first portion of the utterance matches a predefined slot type; and
replacing, based on the identification that the slot matches the predefined slot type, the first portion of the utterance with the first token, wherein the first token corresponds to the predefined slot type.

6. The method of claim 1, further comprising:
determining the utterance includes the first token; and
modifying the utterance such that a second portion of the utterance is replaced as part of the first token based on the one or more slot entropy scores.

7. An electronic device, comprising:
at least one memory; and
at least one processor coupled to the at least one memory, wherein the at least one processor is configured to:
process an utterance using a trained machine learning model;
replace, using the trained machine learning model, a first portion of the utterance with a first token from a slot vocabulary to partially delexicalize the utterance, wherein the first token represents a semantic role of the first portion of the utterance, and wherein the slot vocabulary includes a plurality of words or phrases each associated with one or more tokens included in the slot vocabulary;
determine, using the trained machine learning model, a slot value in the processed utterance based on the first token in the partially delexicalized utterance;
delexicalize, in at least one candidate of one or more candidates that include the processed utterance, at least one word tagged with a slot type corresponding to a high variability slot type;
remove the at least one word from the at least one candidate based on a determination that a slot entropy score for the at least one candidate is above a threshold to create an altered candidate set;
determine, based on a calculated inverse of an average of one or more slot entropy scores, a parsing confidence score for each of the one or more candidates including the processed utterance;
select the processed utterance from among the one or more candidates based on the parsing confidence score for the processed utterance; and
perform a task corresponding to the utterance based on the determined slot value and the selected processed utterance.

8. The electronic device of claim 7, wherein:
the trained machine learning model is trained using training data including tokens and non-tokens for learning one or more semantic relationships between the tokens and the non-tokens; and
the slot vocabulary includes data different from the training data and is domain-dependent.

9. The electronic device of claim 7, wherein the at least one processor is further configured to replace at least a second portion of the utterance with a second token prior to processing the utterance using the trained machine learning model.

10. The electronic device of claim 9, wherein the at least one processor is further configured to determine the second token based on string-matching of the second portion of the utterance and a content in the slot vocabulary.

11. The electronic device of claim 7, wherein, to replace the first portion of the utterance with the first token, the at least one processor is configured to:
identify that a slot associated with the first portion of the utterance matches a predefined slot type; and replace, based on the identification that the slot matches the predefined slot type, the first portion of the utterance with the first token, wherein the first token corresponds to the predefined slot type.

12. The electronic device of claim 7, wherein the at least one processor is configured to:
    determine the utterance includes the first token; and
    modify the utterance such that a second portion of the utterance is replaced as part of the first token based on the one or more slot entropy scores.

13. A non-transitory computer readable medium embodying a computer program, the computer program comprising instructions that when executed cause at least one processor of an electronic device to:
    process an utterance using a trained machine learning model;
    replace, using the trained machine learning model, a first portion of the utterance with a first token from a slot vocabulary to partially delexicalize the utterance, wherein the first token represents a semantic role of the first portion of the utterance, and wherein the slot vocabulary includes a plurality of words or phrases each associated with one or more tokens included in the slot vocabulary;
    determine, using the trained machine learning model, a slot value in the processed utterance based on the first token in the partially delexicalized utterance;
    delexicalize, in at least one candidate of one or more candidates that include the processed utterance, at least one word tagged with a slot type corresponding to a high variability slot type;
    remove the at least one word from the at least one candidate based on a determination that a slot entropy score for the at least one candidate is above a threshold to create an altered candidate set;
    determine, based on a calculated inverse of an average of one or more slot entropy scores, a parsing confidence score for each of the one or more candidates including the processed utterance;
    select the processed utterance from among the one or more candidates based on the parsing confidence score for the processed utterance; and
    perform a task corresponding to the utterance based on the determined slot value and the selected processed utterance.

14. The non-transitory computer readable medium of claim 13, wherein the instructions when executed further cause the at least one processor to replace at least a second portion of the utterance with a second token prior to processing the utterance using the trained machine learning model.

15. The non-transitory computer readable medium of claim 14, wherein the instructions when executed further cause the at least one processor to determine the second token based on string-matching of the second portion of the utterance and a content in the slot vocabulary.

16. The non-transitory computer readable medium of claim 13, wherein the instructions that when executed cause the at least one processor to replace the first portion of the utterance with the first token further cause the processor to:
    identify that a slot associated with the first portion of the utterance matches a predefined slot type; and
    replace, based on the identification that the slot matches the predefined slot type, the first portion of the utterance with the first token, wherein the first token corresponds to the predefined slot type.

17. The non-transitory computer readable medium of claim 13, wherein the instructions when executed further cause the processor to:
    determine the utterance includes the first token; and
    modify the utterance such that a second portion of the utterance is replaced as part of the first token based on the one or more slot entropy scores.

18. A method for training a machine learning model for natural language understanding (NLU), the method comprising:
    retrieving, by at least one processor of an electronic device, an NLU training dataset and a slot vocabulary, wherein the slot vocabulary includes a plurality of words or phrases each associated with one or more tokens included in the slot vocabulary;
    generating, by the at least one processor of the electronic device, a partially delexicalized training dataset using the NLU training dataset and the slot vocabulary by replacing at least one word or phrase in the NLU training dataset with at least one of the tokens in the slot vocabulary;
    generating, by the at least one processor of the electronic device, a combined training dataset by combining the NLU training dataset and the partially delexicalized training dataset; and
    training a machine learning model using the combined training dataset;
    wherein the trained machine learning model (i) delexicalizes, in at least one candidate of one or more candidates that include the processed utterance, at least one word tagged with a slot type corresponding to a high variability slot type, (ii) removes the at least one word from the at least one candidate based on a determination that a slot entropy score for the at least one candidate is above a threshold to create an altered candidate set, (iii) determines, based on a calculated inverse of an average of one or more slot entropy scores, a parsing confidence score for each of the one or more candidates including the processed utterance, (iv) selects the processed utterance from among the one or more candidates based on the parsing confidence score for the processed utterance, and (v) performs a task based on the selected processed utterance.

19. The method of claim 18, wherein the at least one of the tokens is associated with the at least one word or phrase.

20. The method of claim 18, wherein replacing the at least one word or phrase in the NLU training dataset with the at least one of the tokens includes selecting the at least one word to be replaced randomly from the NLU training dataset.

21. The method of claim 18, wherein replacing the at least one word or phrase in the NLU training dataset with the at least one of the tokens includes selecting the at least one word to be replaced from the NLU training dataset based on a probability.

22. The method of claim 18, wherein:
    the combined training dataset includes utterances both with and without delexicalized tokens; and
    training the machine learning model using the combined training dataset includes determining a model confidence based on semantic relationships in the combined training dataset.

* * * * *